(12) United States Patent
Jin et al.

(10) Patent No.: US 10,684,509 B2
(45) Date of Patent: Jun. 16, 2020

(54) DISPLAY DEVICE

(71) Applicant: Samsung Display Co., Ltd., Yongin-si, Gyeonggi-do (KR)

(72) Inventors: Yong Su Jin, Cheonan-si (KR); Gi Young Kang, Cheonan-si (KR); Ji Sang Seo, Gwangju (KR)

(73) Assignee: Samsung Display Co., Ltd., Yongin-si (KR)

( * ) Notice: Subject to any disclaimer, the term of this patent is extended or adjusted under 35 U.S.C. 154(b) by 18 days.

(21) Appl. No.: 15/955,546

(22) Filed: Apr. 17, 2018

(65) Prior Publication Data

US 2019/0113796 A1 Apr. 18, 2019

(30) Foreign Application Priority Data

Oct. 17, 2017 (KR) .......................... 10-2017-0134653

(51) Int. Cl.
| G02F 1/1335 | (2006.01) |
| G02F 1/1333 | (2006.01) |
| F21V 8/00 | (2006.01) |
| G02F 1/13357 | (2006.01) |

(52) U.S. Cl.
CPC ....... *G02F 1/133615* (2013.01); *G02B 6/005* (2013.01); *G02B 6/0053* (2013.01);
(Continued)

(58) Field of Classification Search
CPC ............. G02F 1/133308; G02F 1/1336; G02F 2001/133614; G02F 2001/133317;
(Continued)

(56) References Cited

U.S. PATENT DOCUMENTS

2002/0191131 A1\* 12/2002 Ota .................. G02F 1/133512
349/110
2003/0202135 A1\* 10/2003 Ono ..................... G02B 6/0088
349/63
(Continued)

FOREIGN PATENT DOCUMENTS

| JP | 2016181474 A | \* 10/2016 |
| KR | 20140058991 A | \* 5/2014 |
| KR | 10-2017-0047787 A | 5/2017 |

OTHER PUBLICATIONS

English translation of KR-20140058991-A, Title: Liquid Crystal Display Apparatus, Author:Heo Hanna; Date of publication: May 15, 2014 (Year: 2014).\*

(Continued)

*Primary Examiner* — Shan Liu
(74) *Attorney, Agent, or Firm* — Lewis Roca Rothgerber Christie LLP

(57) ABSTRACT

A display device includes a light guide plate; a light source facing a first side surface of the light guide plate; a display panel located on the light guide plate; and a coupling member located between the light guide plate and the display panel to couple the light guide plate with the display panel. The coupling member includes a first light transmission blocking tape having a first portion along an edge portion of an upper surface of the light guide plate and a second portion extending from the first portion and coupled to a side surface other than the first side surface of the light guide plate, and a coupling tape located on the first portion of the first light transmission blocking tape and coupled to the first light transmission blocking tape.

29 Claims, 26 Drawing Sheets

(52) U.S. Cl.
CPC ......... G02B 6/0055 (2013.01); G02F 1/1336 (2013.01); G02F 1/133308 (2013.01); G02F 1/133512 (2013.01); G02B 6/0088 (2013.01); G02F 2001/133317 (2013.01); G02F 2001/133614 (2013.01); G02F 2202/28 (2013.01)

(58) Field of Classification Search
CPC ... G02F 1/133608; G02F 2001/133311; G02F 2001/133314; G02F 2001/13332; G02F 2001/133322; G02F 2001/133325; G02F 2001/133328; G02F 2001/133331; G02F 2001/133334; G02F 2001/133607; G02F 2001/133616; G02F 1/133606; G02F 1/133504; G02B 6/0088; G02B 6/0055; G02B 6/0053
USPC ....................................................... 349/58–64
See application file for complete search history.

(56) References Cited

U.S. PATENT DOCUMENTS

| | | | |
|---|---|---|---|
| 2008/0018826 A1* | 1/2008 | Bae | G02F 1/133308 349/58 |
| 2010/0182540 A1* | 7/2010 | Mifune | G02B 6/005 349/65 |
| 2013/0115388 A1* | 5/2013 | Tseng | C09J 7/22 428/34.1 |
| 2014/0085563 A1* | 3/2014 | Mathew | G02F 1/133308 349/58 |
| 2015/0124195 A1* | 5/2015 | Chen | G02F 1/133512 349/61 |
| 2017/0116928 A1 | 4/2017 | Kim | |
| 2017/0363803 A1* | 12/2017 | Nakamori | G02F 1/133308 |
| 2018/0149800 A1* | 5/2018 | Kim | G02B 6/0055 |
| 2018/0149922 A1* | 5/2018 | Sugiyama | G02F 1/133308 |
| 2018/0157097 A1* | 6/2018 | Wang | G02F 1/133308 |
| 2018/0356581 A1* | 12/2018 | Chen | G02B 6/005 |
| 2019/0018276 A1* | 1/2019 | Masamoto | G02B 6/005 |

OTHER PUBLICATIONS

English translation of JP-2016181474-A, Title: Light Guide Member, Surface Light Source Device and Display Device, Author:Inoue Akira, Arakawa Fumihiro; Date of publication: Oct. 13, 2016 (Year: 2016).*

* cited by examiner

DISPLAY DEVICE

CROSS-REFERENCE TO RELATED APPLICATION

This application claims priority to and the benefit of Korean Patent Application No. 10-2017-0134653 filed on Oct. 17, 2017 in the Korean Intellectual Property Office, the contents of which in its entirety are herein incorporated by reference.

BACKGROUND

1. Field

One or more aspects of example embodiments of the present disclosure relate to a display device.

2. Description of the Related Art

In a non-emissive display device, such as a liquid crystal display device, a display panel which generates an image does not emit light by itself, and instead generates an image using light provided from a backlight unit. The backlight unit includes a light source and a light guide plate for guiding the light emitted from the light source with surface light emission.

The backlight unit is located below (e.g., behind) the display panel relative to the viewpoint of users of the display panel during use, and the display panel and the backlight unit are coupled to each other via a coupling member.

SUMMARY

Aspects of embodiments of the present disclosure provide a display device which is easy to manufacture and has improved display quality.

Further, according to embodiments of the present disclosure, it is possible to provide a display device with improved display quality by preventing light leakage.

The effects of the embodiments of the present disclosure are not limited to the above-described effects and other effects which are not described herein will become apparent to those skilled in the art from the following description.

In some embodiments, a display device includes a light guide plate; a light source facing a first side surface of the light guide plate; a display panel located on the light guide plate; and a coupling member located between the light guide plate and the display panel to couple the light guide plate with the display panel. The coupling member includes a first light transmission blocking tape having a first portion disposed along an edge portion of an upper surface of the light guide plate and a second portion extending from the first portion and coupled to a side surface other than the first side surface of the light guide plate, and a coupling tape located on the first portion of the first light transmission blocking tape and coupled to the first light transmission blocking tape.

In some embodiments, a display device includes a light guide plate; a light source disposed on one side of the light guide plate; a display panel located on the light guide plate; and a coupling member located between the light guide plate and the display panel to couple the light guide plate with the display panel. The coupling member includes a light transmission blocking tape having a first portion disposed along a bottom edge of the display panel and a second portion extending from the first portion and coupled to one side surface of the display panel, and a coupling tape located between the first portion of the light transmission blocking tape and the light guide plate and coupled to the light transmission blocking tape.

BRIEF DESCRIPTION OF THE DRAWINGS

The above and other aspects and features of the present disclosure will become more apparent by reference to the following detailed description when considered in conjunction with the accompanying drawings, in which.

DETAILED DESCRIPTION

Figure 1:
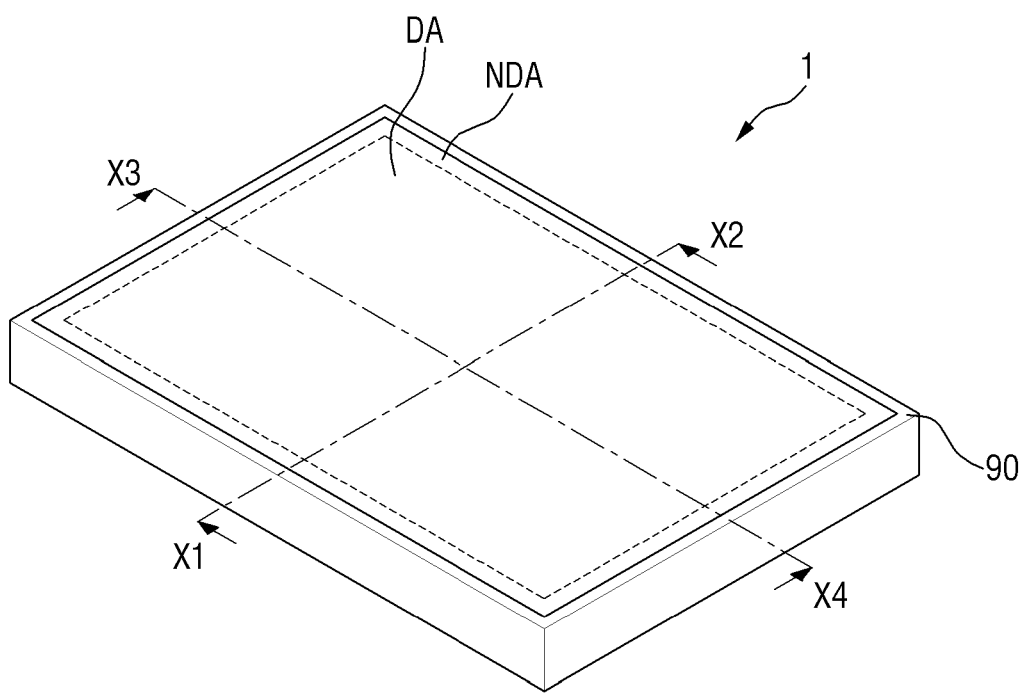
FIG. 1 is a perspective view of a display device according to some embodiments of the present disclosure.
Figure 1:
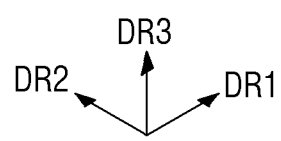

Hereinafter, example embodiments will now be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

In the drawings, thicknesses of a plurality of layers and areas may be illustrated in an enlarged manner for clarity and ease of description thereof.

It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that when an area or element is referred to as being "on," "connected to," or "coupled to" another area or element, it may be directly on, connected, or coupled to the other area or element, or intervening areas or elements may be present therebetween. Conversely, when an area or element is referred to as being "directly on," "directly connected to," or "directly coupled to" another area or element, there are no intervening areas or elements therebetween. In addition, it will also be understood that when an area or element is referred to as being "between" two areas or elements, it can be the only area or element between the two areas or elements, or one or more intervening areas or elements may also be present.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

When a certain embodiment may be implemented differently, a specific process order may be performed differently from the described order. For example, two consecutively described processes may be performed substantially at the same time or performed in an order opposite to the described order.

Expressions such as "at least one of," when preceding a list of elements, modify the entire list of elements and do not only modify the individual elements of the list. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

As used herein, the terms "substantially," "about," "approximately" and similar terms are used as terms of approximation and not as terms of degree, and are intended to account for the inherent deviations in measured or calculated values that would be recognized by those of ordinary skill in the art. Further, these terms as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

FIG. 1 is a perspective view of a display device according to some embodiments of the present disclosure.

Referring to FIG. 1, a display device 1 may be applied to various electronic apparatuses including small and medium-sized electronic equipment such as a tablet PC, a smart phone, a car navigation unit, a camera, a center information display (CID) provided to an automobile, a wristwatch type electronic device, a personal digital assistant (PDA), a portable multimedia player (PMP) and a game console, and electronic equipment such as a television, an external billboard, a monitor, a personal computer and a laptop computer. However, these are presented only as examples, and the display device 1 may be applied to other electronic apparatuses and equipment without departing from the scope of the present disclosure.

In some embodiments, the display device 1 may have a rectangular shape in a plan view. The display device 1 may include both short sides extending in a first direction DR1 and long sides extending in a second direction DR2 intersecting or crossing the first direction DR1. The corners where the long sides and the short sides of the display device 1 meet may have right angles, but the present disclosure is not limited thereto or thereby, and a curved surface may instead be formed (e.g., in one or more of the corners). The planar shape of the display device 1 is not limited to the embodiment illustrated in FIG. 1, and may have circular or other suitable shapes.

The display device 1 includes a display area DA and a non-display area NDA, and may display an image through the display area DA.

Figure 2:
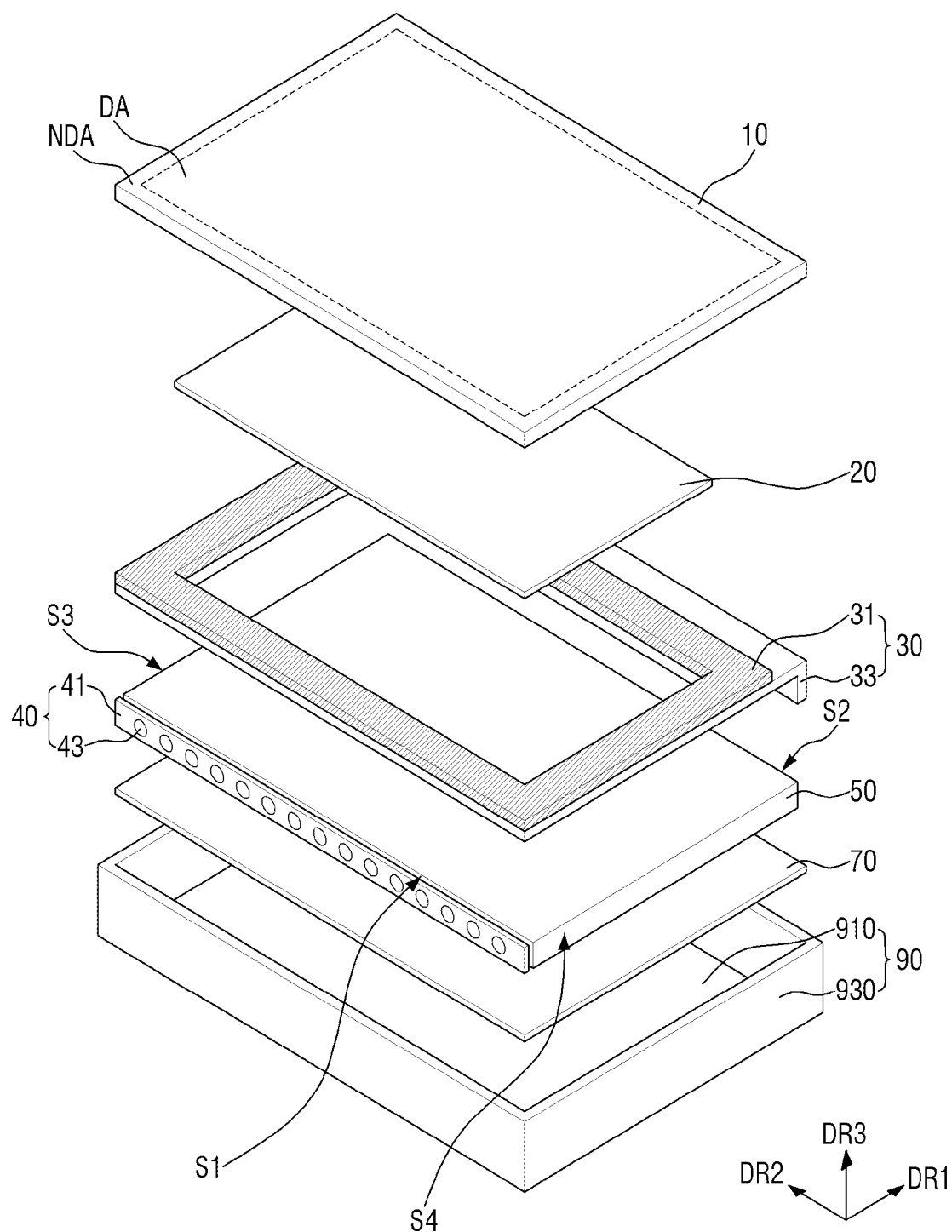
FIG. 2 is a schematic exploded perspective view of the display device shown in FIG. 1.
Figure 3:
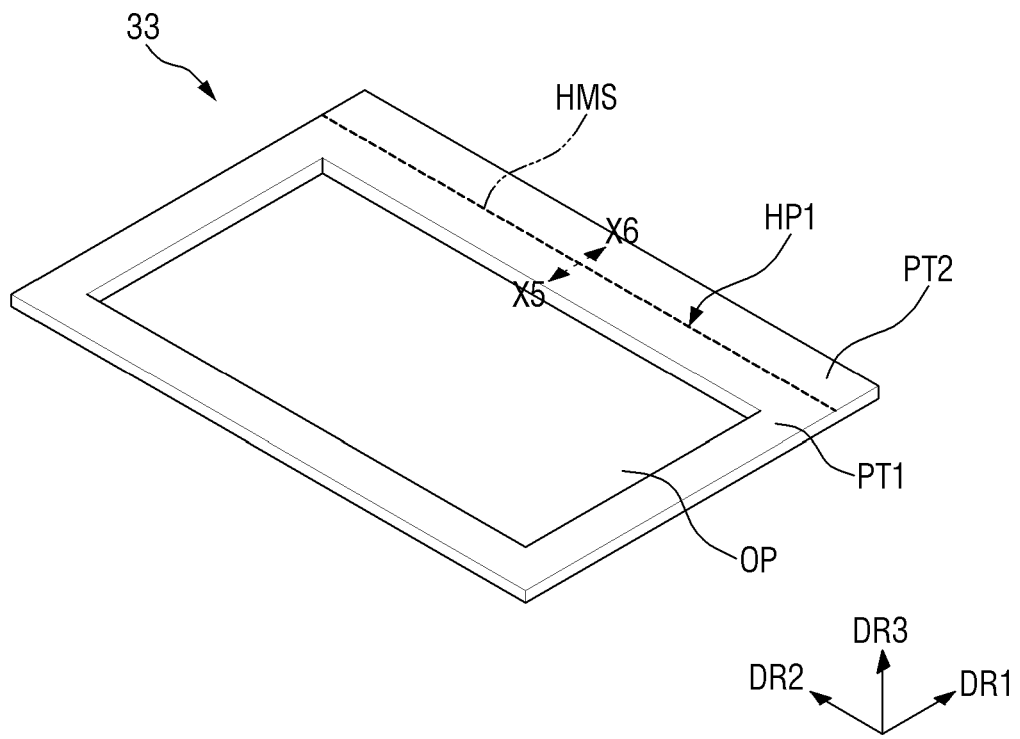
FIG. 3 is a perspective view showing an unfolded state of a first light transmission blocking tape shown in FIG. 2.
Figure 4:
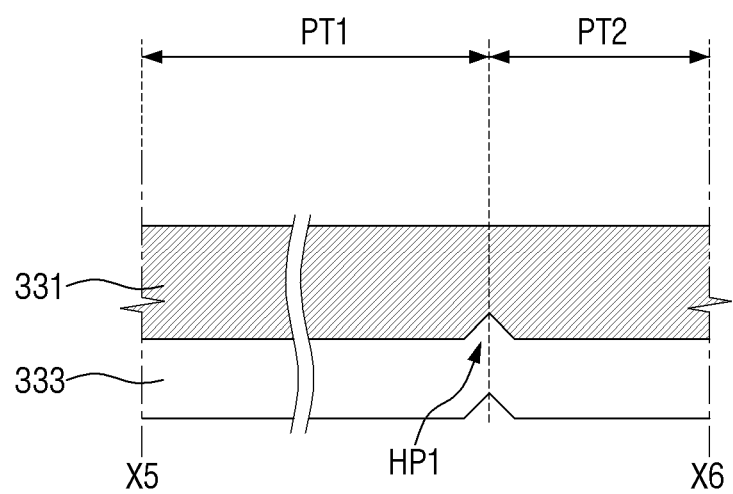
FIG. 4 is a cross-sectional view taken along line X5-X6 of FIG. 3.
Figure 5:
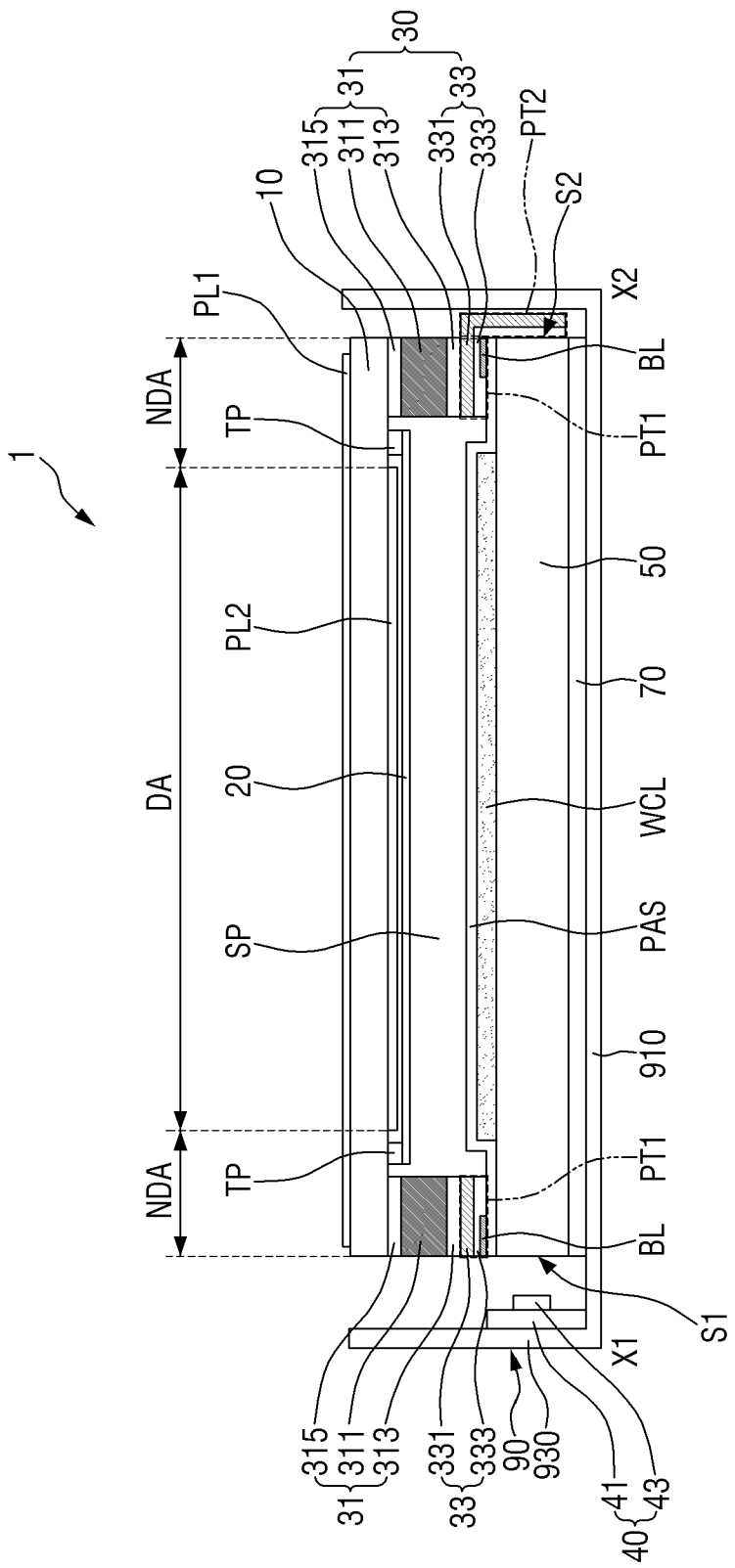
FIG. 5 is a cross-sectional view of the display device taken along line X1-X2 of FIG. 1.
Figure 6:
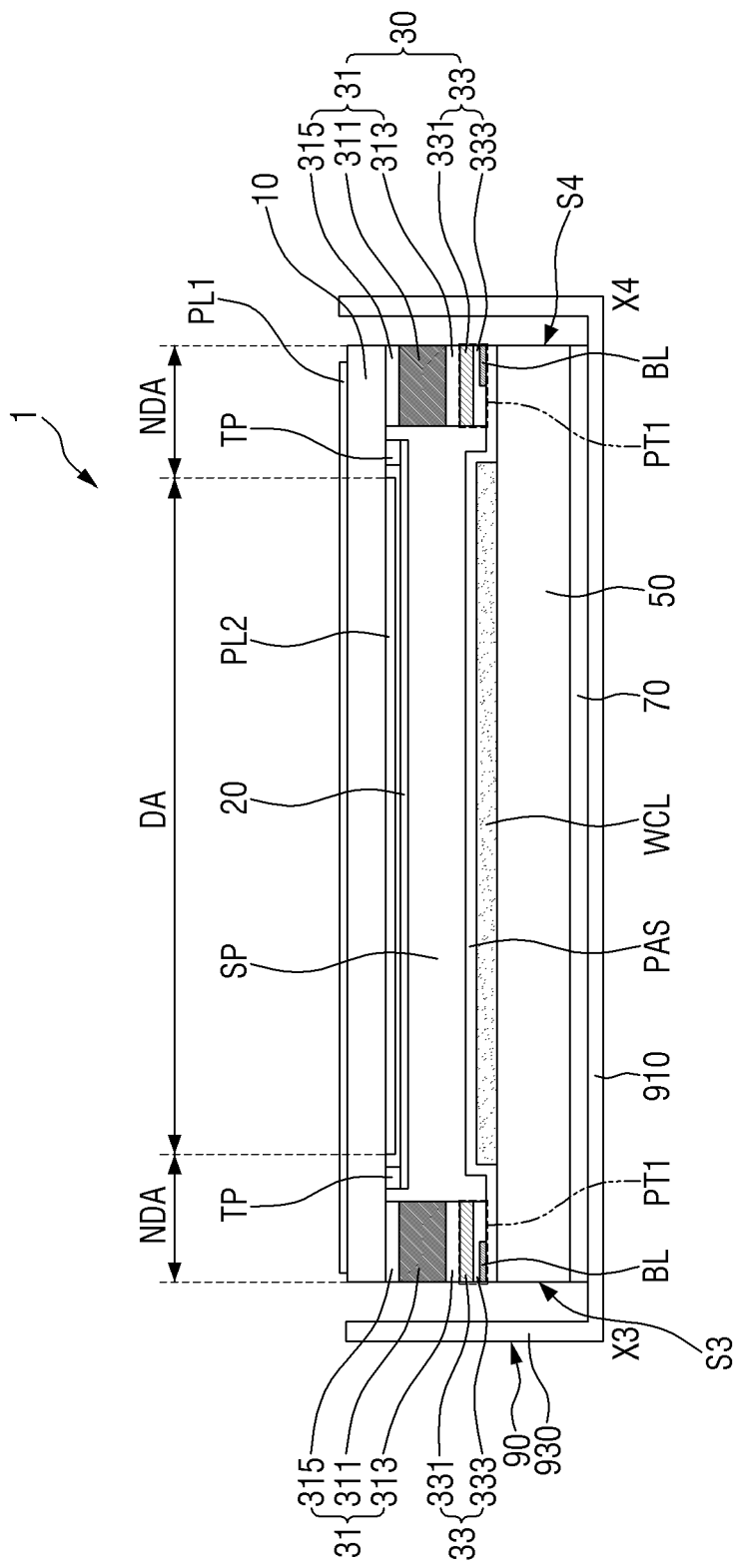
FIG. 6 is a cross-sectional view of the display device taken along line X3-X4 of FIG. 1.

FIG. 2 is a schematic exploded perspective view of the display device shown in FIG. 1. FIG. 3 is a perspective view showing an unfolded state of a first light transmission blocking tape shown in FIG. 2. FIG. 4 is a cross-sectional view taken along line X5-X6 of FIG. 3. FIG. 5 is a cross-sectional view of the display device taken along line X1-X2 of FIG. 1. FIG. 6 is a cross-sectional view of the display device taken along line X3-X4 of FIG. 1.

Referring to FIGS. 2 to 5, the display device 1 includes a display panel 10, a light guide plate 50 disposed below (e.g., located behind) the display panel 10, a coupling member 30 located between the display panel 10 and the light guide plate 50, and a light source member 40 located on one side of the light guide plate 50. The display device 1 may further include an optical sheet or film 20 located between the display panel 10 and the light guide plate 50, and a reflection member 70 and a receiving member 90 located below (e.g., behind) the light guide plate 50.

Unless defined otherwise, as used herein, the terms "upper," "upper side," "upper portion," "top" and "upper surface" refer to the display surface side with respect to the display panel 10 (i.e., a side facing a third direction DR3), and the terms "lower", "lower side," "lower portion," "bottom" and "lower surface" refer to the opposite side of the display surface side with respect to the display panel 10 (i.e., a side facing a direction opposite to the third direction DR3).

As described in more detail below, the display panel 10 receives light provided (e.g., guided) by the light guide plate 50 and generates an image corresponding to input image data. Examples of a light receiving display panel that receives light and displays a screen (e.g., an image) include a liquid crystal display panel, an electrophoretic panel, and the like. Hereinafter, a liquid crystal display panel is exemplified as the display panel 10, but various other light receiving display panels may be applied or used, and the present disclosure is not limited thereto or thereby.

The display panel 10 may include two substrates and a liquid crystal layer disposed between both substrates.

The display panel 10 may include a display area DA and a non-display area NDA. The display area DA is an area for displaying an image, and the non-display area NDA is an area which surrounds the display area DA and where no image is displayed.

In some embodiments, a first polarizing layer PL1 may be disposed on the upper surface of the display panel 10, and a second polarizing layer PL2 may be disposed on the lower surface of the display panel 10 (see FIG. 5). However, this is merely an example, and at least one of the first polarizing layer PL1 and the second polarizing layer PL2 may be located in (e.g., within) the display panel 10 in other embodiments.

The light guide plate 50 is disposed below (e.g., behind) the display panel 10. The light guide plate 50 serves to guide the light provided by a light source 43 of the light source member 40 toward the display panel 10. The light guide plate 50 may have a generally polygonal columnar shape (e.g., a rectangular box shape in some embodiments). The planar shape of the light guide plate 50 may be rectangular, but is not limited thereto or thereby. In some embodiments, the light guide plate 50 may have a hexahedral shape (e.g., a polyhedron shape with six faces) having a rectangular planar shape, and may include upper and lower surfaces and four side surfaces S1, S2, S3 and S4. Hereinafter, the four side surfaces S1, S2, S3 and S4 are referred to as a first side surface S1, a second side surface S2, a third side surface S3 and a fourth side surface S4. The first side surface S1 may be a light incident surface on which the light emitted from the light source 43 is incident. The second side surface S2, which is a surface opposite to the first side surface S1, may be a light facing surface opposite to the light incident surface. The third side surface S3 may connect one end of the first side surface S1 to one end of the second side surface S2, and the fourth side surface S4 may connect the other end of the first side surface S1 to the other end of the second side surface S2.

In some embodiments, the light guide plate 50 may have an entirely uniform thickness, but the thickness of the light guide plate 50 is not limited thereto or thereby. For example, in the case of a wedge-shaped light guide plate 50, the light guide plate 50 may have a thickness which decreases from the first side surface S1 toward the second side surface S2 opposite to the first side surface S1. Further, the thickness of the light guide plate 50 may be reduced to or at a specific point, and the thickness of the light guide plate 50 may be constant after the specific point.

In some embodiments, a scattering pattern may be disposed on the lower surface of the light guide plate 50. The scattering pattern serves to change the traveling angle of the light propagating in the light guide plate 50 by total reflection and to output the light to the outside of the light guide plate 50.

In some embodiments, the scattering pattern may be provided as a separate layer or pattern. For example, a pattern layer including a protruding pattern and/or a concave groove pattern may be formed on the lower surface of the light guide plate 50, or a printed pattern may be formed to function as the scattering pattern.

In some embodiments, the scattering pattern may have or be formed to match a surface shape of a surface of the light guide plate 50 itself. For example, concave grooves may be formed on the lower surface of the light guide plate 50 to function as the scattering pattern.

The material forming the light guide plate 50 may include at least one selected from the group consisting of polyamide (PA), polymethyl methacrylate (PMMA), methyl methacrylate-styrene (MS), polycarbonate (PC) and glass. In some embodiments, the light guide plate 50 may be made of glass. In the case where the light guide plate 50 is made of glass, the resistance to penetration of the display device can be improved to prevent external moisture and air from penetrating the display device. Further, the light guide plate 50 can protect a wavelength conversion layer WGL from heat.

The light source member 40 may be disposed adjacent to at least one side surface of the light guide plate 50 (e.g., the first side surface S1 in some embodiments). The light source member 40 may include the light source 43 and a printed circuit board 41. The light source 43 may be mounted on the printed circuit board 41 to receive a driving voltage from the printed circuit board 41. The light source 43 provided with the driving voltage may provide light to the light guide plate 50. The light source 43 may include a plurality of point light sources or linear light sources. The point light source may be a light emitting diode (LED) light source 43. The LED light source 43 may be a blue light source emitting blue light.

In some embodiments, the LED light source 43 may be a top-emitting LED that emits light through the upper surface of the LED light source 43 as shown in FIGS. 2 and 5 (e.g., the surface of the LED light source 43 that faces the first side surface S1 of the light guide plate 50). In such a case, the printed circuit board 41 may be disposed on a sidewall 930 of the receiving member 90.

Alternatively, in some embodiments, the LED light source 43 may be a side-emitting LED that emits light through a side surface of the LED light source 43. In such a case, the printed circuit board 41 may be disposed on a bottom surface 910 of the receiving member 90.

Although it is illustrated in FIG. 5 that the light source member 40 is disposed adjacent to the first side surface S1 located at one long side of the light guide plate 50, the present disclosure is not limited thereto or thereby. For example, the light source member 40 may be disposed adjacent to all of the side surfaces of both long sides of the light guide plate 50 (e.g., the first side surface S1 and the second side surface S2). Also, the light source member 40 may be disposed adjacent to one of the side surfaces of the short sides of the light guide plate 50 (e.g., the third side surface S3 or the fourth side surface S4), and may be disposed adjacent to both of the side surfaces of the short sides of the light guide plate 50 (e.g., the third side surface S3 and the fourth side surface S4).

The wavelength conversion layer WCL may be disposed on the upper surface of the light guide plate 50. The wavelength conversion layer WCL converts the wavelength of at least a part of the incident light. The wavelength conversion layer WCL may overlap the display area DA of the display panel 10. In some embodiments, a part of the wavelength conversion layer WCL may further overlap the non-display area NDA of the display panel 10.

The wavelength conversion layer WCL may include a binder layer and wavelength conversion particles dispersed in the binder layer. The wavelength conversion layer WCL may further include scattering particles dispersed in the binder layer in addition to the wavelength conversion particles.

The binder layer is a medium in which the wavelength conversion particles are dispersed, and may be formed of various resin compositions which may be generally referred to as a binder. However, the present disclosure is not limited thereto or thereby, and in the present disclosure, a medium capable of dispersing and arranging the wavelength conversion particles and/or scattering particles may be referred to as a binder layer regardless of its name, additional other functions, constituent materials, and the like.

The wavelength conversion particle is a particle for converting the wavelength of incident light, and may be, for example, a quantum dot (QD), a fluorescent material or a phosphorescent material. The quantum dot, which is an example of a wavelength conversion particle, is a material having a crystal structure of a few nanometers in size and including hundreds to thousands of atoms, and exhibits a quantum confinement effect in which the energy band gap becomes larger due to its small size. When light having a wavelength with higher energy than the band gap is incident on the quantum dot, the quantum dot is excited by absorbing the light, and falls to a ground state while emitting light of a specific wavelength. The light of the emitted wavelength has a value corresponding to the band gap. The luminescence characteristics due to the quantum confinement effect can be adjusted by adjusting the size and composition of quantum dots.

The quantum dots may include, for example, at least one compound selected from the group consisting of Group II-VI compounds, Group II-V compounds, Group III-VI compounds, Group III-V compounds, Group IV-VI compounds, Group compounds, II-IV-VI group compounds and II-IV-V group compounds.

The quantum dot may include a core and a shell that overcoats the core. The core may be, but is not limited to, at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si and Ge. The shell may be, but is not limited to, at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe.

The wavelength conversion particles may include a plurality of wavelength conversion particles which convert incident light into light having different wavelengths. For example, the wavelength conversion particles may include first wavelength conversion particles which convert incident light of a specific wavelength into light of a first wavelength and emit the converted light, and second wavelength conversion particles which convert incident light of a specific wavelength into light of a second wavelength (e.g., different from the first wavelength) and emit the converted light. In some embodiments, the light emitted from the light source 43 and incident on the wavelength conversion particles may be light of a blue wavelength, the first wavelength may be a green wavelength, and the second wavelength may be a red wavelength. For example, the blue wavelength may be a wavelength having a peak at 420 to 470 nm, the green wavelength may be a wavelength having a peak at 520 nm to 570 nm, and the red wavelength may be a wavelength having a peak at 620 nm to 670 nm. However, it should be understood that the blue, green, and red wavelengths are not limited to the above examples and include all wavelength ranges that can be recognized as blue, green, and red in the art.

In the above example embodiment, when the blue light incident on the wavelength conversion layer WCL passes through the wavelength conversion layer WCL, a part of the incident blue light may be incident on the first wavelength conversion particles and converted into light of a green wavelength, another part of the incident blue light may be incident on the second wavelength conversion particles and converted into light of a red wavelength, and a remaining part of the incident blue light may be emitted as it is without being incident on the first and second wavelength conversion particles. Accordingly, the light having passed through the wavelength conversion layer WCL includes all of blue wavelength light, green wavelength light, and red wavelength light. If the ratio of the emitted lights of different wavelengths is appropriately adjusted, the emitted light of white light or other colors may be displayed. The emitted lights converted in the wavelength conversion layer WCL are concentrated within a narrow range of specific wavelengths, and have a sharp spectrum with a narrow half width. Therefore, when light having the spectrum is filtered by a color filter to implement colors, the color reproducibility can be improved.

Unlike the above example embodiment, the incident light may be short wavelength light, such as ultraviolet light, and three types of wavelength conversion particles for converting the incident light into lights of blue, green and red wavelengths, respectively, may be arranged in the wavelength conversion layer WCL to emit white light.

The wavelength conversion layer WCL may further include scattering particles. The scattering particles may be non-quantum particles, which have no wavelength conversion function. The scattering particles scatter the incident light so that more incident light can be incident on the wavelength conversion particles. In addition, the scattering particles may serve to uniformly control the emission angle of light of each wavelength. Specifically, the wavelength conversion particles have scattering characteristics such that when a part of the incident light is incident on the wavelength conversion particles and emitted after converting the wavelength of the incident light, the emission direction is random. If there are no scattering particles in the wavelength conversion layer WCL, green and red wavelength light emitted after collision with the wavelength conversion particles will have scattering emission characteristics, but blue wavelength light emitted without collision with the wavelength conversion particles will not have scattering emission characteristics. Accordingly, the emission amount of blue/green/red wavelength light will be different depending on the emission angle (i.e., without the use of the scattering particles). The scattering particles impart scattering emission characteristics to the blue wavelength light that is emitted without colliding with the wavelength converting particles, so that the emission angle of light of each wavelength can be similarly controlled. As the scattering particles, $TiO_2$, $SiO_2$, and the like may be used.

The wavelength conversion layer WCL may be formed by a method such as coating. For example, a wavelength conversion composition may be slit-coated on the light guide plate 50, dried and cured to form the wavelength conversion layer WCL. However, the formation of the wavelength conversion layer WCL is not limited thereto or thereby, and various other lamination methods may be applied.

A passivation layer PAS may be disposed on the wavelength conversion layer WCL. The passivation layer PAS serves to prevent penetration of moisture and/or oxygen (hereinafter referred to as "moisture/oxygen"). In some embodiments, the passivation layer PAS may include an inorganic material. For example, the passivation layer PAS may be formed to include silicon nitride, aluminum nitride, zirconium nitride, titanium nitride, hafnium nitride, tantalum nitride, silicon oxide, aluminum oxide, titanium oxide, tin oxide, cerium oxide and silicon oxynitride, or a metal thin film having a desired light transmittance or the like. In some embodiments, the passivation layer PAS may be formed of silicon nitride.

In some embodiments, the passivation layer PAS may completely cover the wavelength conversion layer WCL on at least one side surface. In some embodiments, the passivation layer PAS may completely cover the wavelength conversion layer WCL on all side surfaces, but the present disclosure is not limited thereto or thereby.

In some embodiments, the passivation layer PAS may completely cover the the upper surface of the wavelength conversion layer WCL and extend further outward from the upper surface to cover one or more of the side surfaces of the wavelength conversion layer WCL, and may cover all of the side surfaces. In some embodiments, the passivation layer PAS may extend to the edge of the upper surface of the light guide plate 50 exposed by (e.g., not covered by) the wavelength conversion layer WCL, so that a part of the edge of the passivation layer PAS can be in direct contact with the upper surface of the light guide plate 50.

The wavelength conversion layer WCL, particularly, the wavelength conversion particles contained therein, is vulnerable to moisture/oxygen. In the case of a wavelength conversion film, a barrier film is laminated on the upper and lower surfaces of the wavelength conversion layer to prevent moisture/oxygen penetration into the wavelength conversion layer. However, in some embodiments where the wavelength conversion layer WCL is directly disposed on the light guide plate 50 without the barrier film, it may be necessary to provide a sealing structure for protecting the wavelength conversion layer WCL in place of the barrier film. The sealing structure may be implemented by the passivation layer PAS and the light guide plate 50.

The passivation layer PAS may be formed by a method such as vapor deposition. For example, the passivation layer PAS may be formed on the light guide plate 50, on which the wavelength conversion layer WCL is formed, by chemical vapor deposition. However, the formation of the passivation layer PAS is not limited thereto or thereby, and various other lamination methods may be applied.

As described above, the light guide plate 50 and the wavelength conversion layer WCL may be integrated into a single member that performs both a light guide function and a wavelength conversion function. The integrated single member can simplify an assembly process of the display device 1. Further, by sealing the wavelength conversion layer WCL with the passivation layer PAS or the like, deterioration of the wavelength conversion layer WCL can be prevented.

Further, relative to the case of using a wavelength conversion film provided as a separate film, the manufacturing cost here can be relatively lowered and the thickness can be reduced. For example, a separate wavelength conversion film adheres to the upper and lower barrier films of the wavelength conversion layer WCL. The barrier film is not only expensive but also thick (having a thickness of 100 μm or more), and thus, the total thickness of the wavelength conversion film becomes about 270 μm. On the other hand, in the case of the present embodiment, since a separate barrier film can be omitted, the thickness of the display device 1 can be reduced. In addition, since an expensive barrier film can be omitted, it is possible to reduce the manufacturing cost as compared to the case of using the separate wavelength conversion film.

In some embodiments, a light transmission blocking pattern BL may be disposed on edge portions of the upper surface of the light guide plate 50. The light transmission blocking pattern BL absorbs or reflects the incident light to partially or completely block the transmission of light in the corresponding area. Illustratively, the light transmission blocking pattern BL may be located on the passivation layer PAS on the edge portions of the upper surface of the light guide plate 50.

In some embodiments, the light transmission blocking pattern BL may include a reflective layer. The reflective layer may include a light reflecting material having high reflectivity. The light reflecting material may be a metal having excellent reflectivity such as silver (Ag) or a white resin having excellent reflectivity. As another example, similarly to a reflective polarizing film, the reflective layer may have a structure in which a plurality of layers having different refractive indexes are stacked. The reflective layer may be deposited or coated directly on the passivation layer PAS. As another example, a separate member including a reflective layer may be attached through an adhesive layer.

In some embodiments, the light transmission blocking pattern BL may include a light absorbing layer. The light absorbing layer may include a light absorbing material such as a black pigment and/or a dye. The light absorbing layer may be directly coated on the passivation layer PAS, or may be attached through an adhesive layer.

Although it is illustrated in some embodiments that the light transmission blocking pattern BL is located only on the passivation layer PAS, the present disclosure is not limited thereto or thereby. When the passivation layer PAS exposes a part or portion of the edge of the upper surface of the light guide plate 50 (e.g., the passivation layer PAS does not cover the portion of the upper surface), a part or portion of the light transmission blocking pattern BL may directly contact the exposed portion of the edge of the upper surface of the light guide plate 50.

Alternatively, in another embodiment, the light transmission blocking pattern BL may be located between the light guide plate 50 and the passivation layer PAS. Hereinafter, a case where the light transmission blocking pattern BL is located on the passivation layer PAS will be described as an example.

The amount of light emitted from the upper surface of the light guide plate 50 may differ from region to region. For example, near the first side surface S1, which is a light incident surface, the light incident on the upper surface of the light guide plate 50 at an angle smaller than the critical angle of total reflection is relatively large. Therefore, near the first side surface S1, the amount of light emitted from the upper surface of the light guide plate 50 may be larger compared to other regions. Also near the second side surface S2, which is a light facing surface, or near the third side surface S3 or the fourth side surface S4, the light reflected by the adjacent receiving member 90 or the like may be emitted upward without following a light guide path.

As described above, the edge portion of the upper surface of the light guide plate 50 may have a larger light emission amount than the central portion of the upper surface of the light guide plate 50, which may be viewed as light leakage from the display screen.

The light transmission blocking pattern BL is disposed at the edge portion of the upper surface of the light guide plate 50 having a relatively large light emission amount, and serves to block the light leakage and/or to increase the luminance uniformity.

In some embodiments, the light transmission blocking pattern BL may be arranged in a rectangular frame on the edge portions of the upper surface of the light guide plate 50, near the four sides of the light guide plate 50. The width of the light transmission blocking pattern BL may be uniform at each edge portion, but may be widest at the edge portion near the light incident surface, e.g., the first side surface S1, having a relatively large amount of light entering.

However, the present disclosure is not limited thereto or thereby. In some embodiments, the light transmission blocking pattern BL may be disposed only at the edge portion of the upper surface of the light guide plate 50 near the first side surface S1 having a relatively large amount of light entering, or may be disposed only at the edge portions near the first side surface S1 and the second side surface S2.

The coupling member 30 may be located between the light guide plate 50 and the display panel 10. The coupling member 30 may be disposed so as to overlap the non-display area NDA of the display panel 10 and so as not to overlap the display area DA of the display panel 10. The light guide plate 50 and the display panel 10 may be coupled via the coupling member 30.

The coupling member 30 may include a first light transmission blocking tape 33 and a coupling tape 31 located on the first light transmission blocking tape 33. That is, the coupling member 30 may have a structure in which different kinds of tapes are combined.

In the laminated structure of the first light transmission blocking tape 33, the first light transmission blocking tape 33 may include a base layer 331 and a first adhesive layer 333 located below the base layer 331.

In some embodiments, the base layer 331 may include a light reflecting material having excellent reflectivity. The light reflecting material may be a metal having excellent reflectivity such as silver (Ag) or a white resin having excellent reflectivity. As another example, similarly to a reflective polarizing film, the reflective layer may have a structure in which a plurality of layers having different refractive indexes are stacked.

In some embodiments, the base layer 331 may include a light absorbing material such as a black pigment and/or a dye.

The first adhesive layer 333 is located below the base layer 331. The base layer 331 may be bonded to a component, e.g., the light guide plate 50, located below the base layer 331 via the first adhesive layer 333.

When the first light transmission blocking tape 33 is divided regionally, the first light transmission blocking tape 33 may include a first portion PT1 having a rectangular frame shape in a plan view and a second portion PT2 extending from the first portion PT1.

The first portion PT1 may be defined as a portion of the base layer 331 and the first adhesive layer 333 of the first light transmission blocking tape 33, which is disposed along the edge portion of the upper surface of the light guide plate 50.

In some embodiments, the first portion PT1 may be located on the passivation layer PAS. The base layer 331 of the first portion PT1 may cover the edge portion of the upper surface of the light guide plate 50, and the first adhesive layer 333 of the first portion PT1 may be in contact with the passivation layer PAS. In some embodiments, when the light transmission blocking pattern BL is provided, the first adhesive layer 333 of the first portion PT1 may be in contact with the light transmission blocking pattern BL.

When the base layer 331 includes a light absorbing material, the first portion PT1 may block light leakage generated at the edge portion of the upper surface of the light guide plate 50. When the base layer 331 includes a light reflecting material, the light emitted from the edge of the upper surface of the light guide plate 50 is reflected back toward the inside of the light guide plate 50 by the first portion PT1, thereby improving the light efficiency.

The second portion PT2 is a portion of the base layer 331 and the first adhesive layer 333 of the first light transmission blocking tape 33, which is bent and extended in one direction from the first portion PT1 to the outside of the light guide plate 50. The second portion PT2 may be coupled to one side surface of the light guide plate 50. In some embodiments, as shown in FIG. 5, the second portion PT2 extends in the first direction DR1 from the first portion PT1 and is bent in the opposite direction of the third direction DR3, so that the second portion PT2 can be coupled with the second side surface S2 which is the light facing surface of the light guide plate 50. That is, the base layer 331 of the second portion PT2 may cover the second side surface S2 of the light guide plate 50, and the first adhesive layer 333 of the second portion PT2 may be in contact with the second side surface S2 of the light guide plate 50.

When the base layer 331 includes a light absorbing material, the second portion PT2 may block light leakage generated from the side surface of the light guide plate 50. In the case where the base layer 331 includes a light reflecting material, light emitted to the side surface of the light guide plate 50 is reflected back to the inside of the light guide plate 50 by the second portion PT2, thereby improving the light efficiency. In particular, in the case of the second side surface S2 which is the light facing surface opposite to the first side surface S1 which is the light incident surface, light leakage is highly likely to occur. Therefore, when the second portion PT2 is coupled to the second side surface S2 which is the light facing surface, the light leakage can be blocked more effectively, and the light efficiency can be further improved.

The first light transmission blocking tape 33 may be provided with a first groove portion HP1 (see FIG. 4). The first groove portion HP1 may be provided at the boundary between the first portion PT1 and the second portion PT2. As the first groove portion HP1 is provided on the first light transmission blocking tape 33, the second portion PT2 can be more easily bent from the first portion PT1.

In some embodiments, the first groove portion HP1 may have an engraved (e.g., notched or recessed) shape from the surface of the base layer 331 and/or the surface of the first adhesive layer 333. Although it is illustrated in FIG. 4 that the first groove portion HP1 has an engraved shape from the lower surface of the base layer 331, the present disclosure is not limited thereto or thereby. In some embodiments, the first groove portion HP1 may be provided on the upper surface of the base layer 331 and may be provided on both the upper surface and the lower surface of the base layer 331.

The first groove portion HP1 may include a plurality of engraved grooves HMS (see FIG. 3). A plurality of engraved grooves HMS are arranged along the extending direction, e.g., the second direction DR2, of the boundary between the first portion PT1 and the second portion PT2. Two of the plurality of engraved grooves HMS adjacent to each other may be spaced apart from each other. Although it is illustrated in FIG. 3 that a plurality of engraved grooves HMS have the same size, the present disclosure is not limited thereto or thereby. For example, the plurality of engraved grooves HMS may have different sizes. Alternatively, some of the engraved grooves may have the same size and some of the engraved grooves may have different sizes.

The coupling tape 31 may be located on the first light transmission blocking tape 33.

The coupling tape 31 may be disposed on the first portion PT1 of the first light transmission blocking tape 33. In some embodiments, the coupling tape 31 may have a rectangular frame shape similar to the first portion PT1.

The lower side of the coupling tape 31 may be coupled to the first portion PT1, and the upper side of the binding tape 31 may be coupled to the display panel 10.

The coupling tape 31 may be a tape, e.g., a light absorbing tape, which absorbs light to prevent transmission of light. The coupling tape 31 may have a laminated structure including a light absorbing layer 311, a second adhesive layer 313, and a third adhesive layer 315.

The light absorbing layer 311 may include a light absorbing material such as a black pigment and/or a dye. The light absorbing layer 311 can block light leakage in a space between the light guide plate 50 and the display panel 10.

In some embodiments, the light absorbing layer 311 may be in the form of a film including a light absorbing material. Illustratively, the light absorbing layer 311 may be made of black polyethylene terephthalate (PET).

Alternatively, in some other embodiments, the light absorbing layer 311 may be formed of a foam member in which a light absorbing material and a resin are mixed. When the light absorbing layer 311 is made of a foam member, it can perform a buffering function, thereby more effectively protecting the display device 1 from an external impact. The resin included in the foam member may be made of at least one selected from an acrylic resin such as polymethyl (meth)acrylate and/or polyethyl (meth)acrylate; a polyester resin such as polyethylene terephthalate, polyethylene isophthalate, polyethylene naphthalate and/or polybutylene terephthalate; a cellulose resin such as diacetylcellulose and/or triacetylcellulose; a polyolefin resin such as polyethylene, polypropylene and/or an ethylene-propylene copolymer; or a polyolefin resin having a cyclo-based or norbornene structure, but the present disclosure is not limited thereto or thereby. In some embodiments, polypropylene may be used as the resin included in the foam member, and the polypropylene has a high permanent compression ratio (i.e., a ratio at which it is in an original state without being restored after compression), and thus has an advantage of preventing the display panel 10 and the light guide plate 50 from being separated due to a repulsive force.

The second adhesive layer 313 may be located below the light absorbing layer 311, and the second adhesive layer 313 may be in contact with the first portion PT1 of the first light transmission blocking tape 33. That is, the light absorbing layer 311 may be combined with the first portion PT1 of the first light transmission blocking tape 33 via the second adhesive layer 313.

The third adhesive layer 315 may be located on the light absorbing layer 311, and the third adhesive layer 315 may be in contact with the bottom edge of the display panel 10. That is, the light absorbing layer 311 may be coupled to the display panel 10 via the third adhesive layer 315.

When the light guide plate 50 and the display panel 10 are coupled using a separate resin, two kinds of resins may be required. For example, a transparent resin may be required to couple the light guide plate 50 and the display panel 10 and to completely cure them, and a black resin may be separately required to block light leakage. Therefore, when coupling the light guide plate 50 and the display panel 10 using the resin, a resin coating and curing process may be performed at least twice. Further, in order to block the light leakage through the side surfaces of the light guide plate 50, a separate structure must be formed on the side surfaces of the light guide plate 50.

On the other hand, according to the present embodiment, since the light guide plate 50 and the display panel 10 are coupled to each other by using the coupling member 30 including different kinds of tapes, there is an advantage of simplifying the manufacturing process. Also, the coupling member 30 includes the coupling tape 31, which is a light absorbing tape, and can cut off the light leakage generated in the space between the light guide plate 50 and the display panel 10. Further, since the coupling member 30 includes the coupling tape 31 which is a light absorbing tape, it is possible to block the light leakage generated in the space between the light guide plate 50 and the display panel 10.

That is, there are advantages of omitting a process for forming a separate structure for preventing light leakage and simplifying the structure of the display device 1. In addition, since the coupling member 30 includes the first light transmission blocking tape 33 and the second portion PT2 of the first light transmission blocking tape 33 is coupled to the side surface of the light guide plate 50, it is advantageously possible to block the light leakage in the light guide plate 50 without performing an additional process for forming a separate structure.

That is, according to the present embodiment, advantageously, a process of coupling the light guide plate 50 and the display panel 10, a process of forming a structure for preventing light leakage in the space between the light guide plate 50 and the display panel 10, and a process of forming a structure for preventing light leakage in the light guide plate 50 itself can be performed in a single process, and the structure of the display device 1 can be simplified.

The display device 1 may further include an optical film 20 disposed in a space SP surrounded by the light guide plate 50, the coupling member 30 and the display panel 10 (see FIG. 5). In some embodiments, an adhesive tape TP coupled to the lower surface of the display panel 10 may be disposed in the space SP, and the optical film 20 may be coupled to the display panel 10 via the adhesive tape TP. In some embodiments, when the second polarizing layer PL2 is located on the lower surface of the display panel 10, the adhesive tape TP may be disposed on the lower surface of the display panel 10 exposed between the coupling member 30 and the second polarizing layer PL2. In some embodiments, the adhesive tape TP may be a double-sided adhesive tape.

The optical film 20 may be a prism film, a diffusion film, a micro-lens film, a lenticular film, a polarizing film, a reflective polarizing film, a retardation film, or the like. The display device 1 may include a plurality of optical films 20 of the same kind or different kinds. When a plurality of optical films 20 are applied, the optical films 20 may be arranged to overlap each other and coupled to each other. In some embodiments, the optical film 20 may be a composite film in which two or more optically functional layers are formed integrally.

The display device 1 may further include the reflection member 70 disposed below the light guide plate 50. The reflection member 70 may include a reflective film or a reflective coating layer. The reflection member 70 reflects the light emitted from the bottom surface of the light guide plate 50 back to the inside of the light guide plate 50.

The display device 1 may further include the receiving member 90. The receiving member 90 has one surface being open and includes a bottom surface 910 and a sidewall 930 connected to the bottom surface 910. The light source member 40, the light guide plate 50, the coupling member 30, the reflection member 70, and the like may be accommodated in the space defined by the bottom surface 910 and the sidewall 930.

Figure 7:
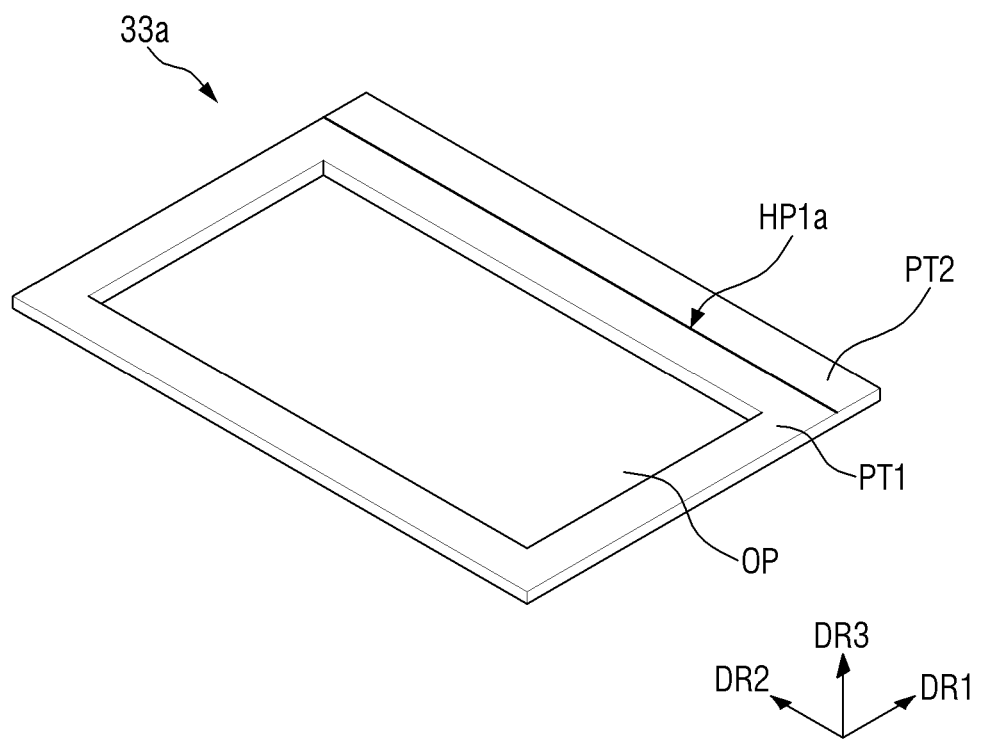
FIG. 7 is a perspective view showing a modified embodiment of FIG. 3.

FIG. 7 is a perspective view showing a modified embodiment of FIG. 3.

Referring to FIG. 7, a first light transmission blocking tape 33a according to some embodiments differs from the first light transmission blocking tape 33 shown in FIG. 3 in that a first groove portion HP1a is provided at the boundary between the first portion PT1 and the second portion PT2 before being bent, and the first groove portion HP1a extends along the second direction DR2 in which the boundary between the first portion PT1 and the second portion PT2 extends. The description of the first light transmission blocking tape 33a and the description of the display device including the first light transmission blocking tape 33a will be omitted to avoid redundancy.

Figure 8:
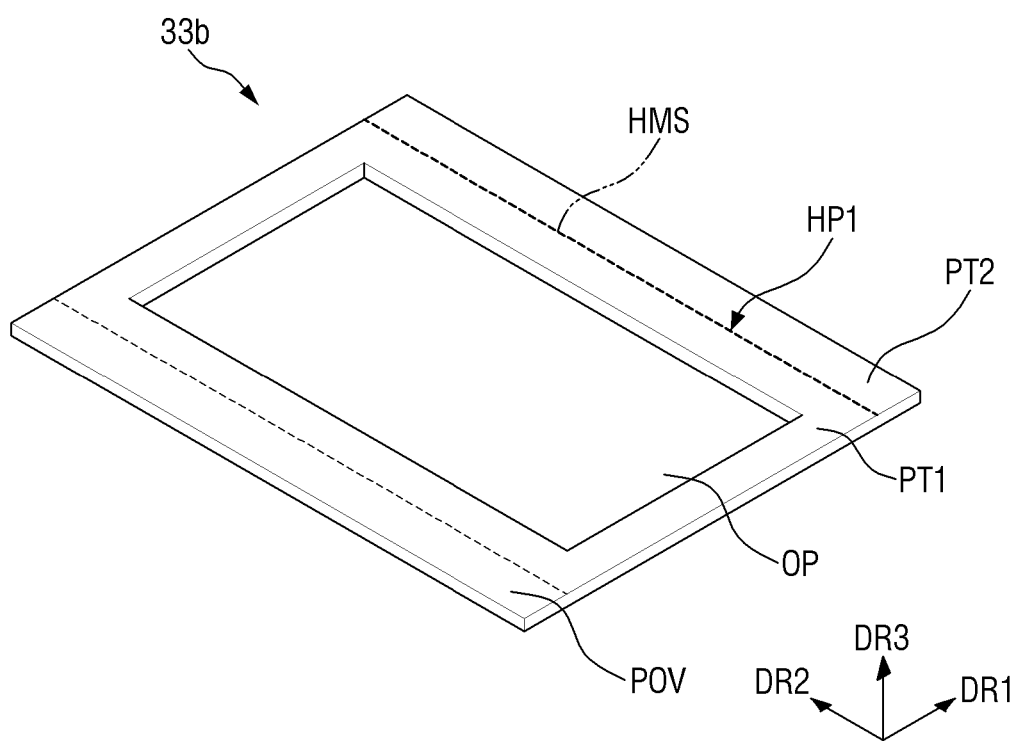
FIG. 8 is a perspective view showing an unfolded state of a first light transmission blocking tape in a display device according to some embodiments.
Figure 9:
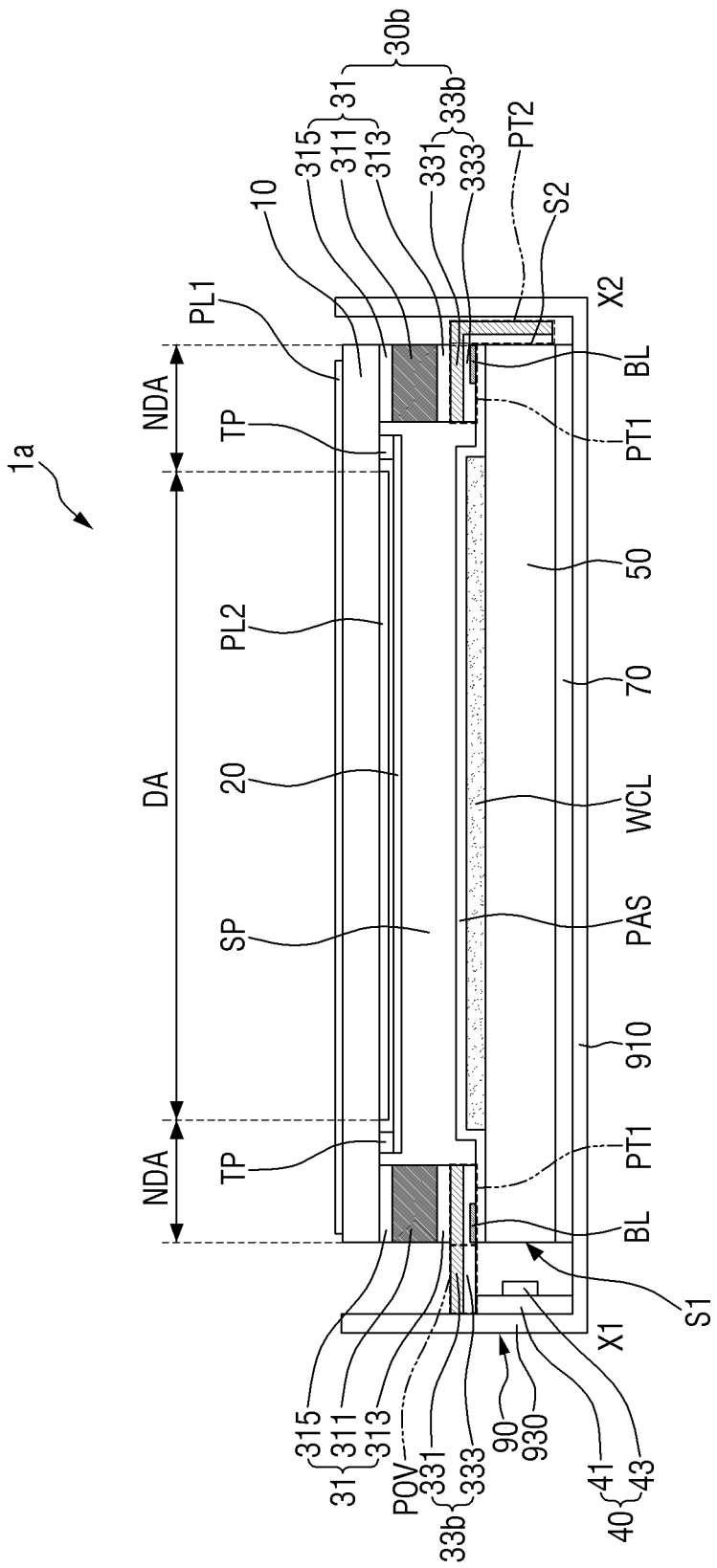
FIG. 9 is a cross-sectional view of a display device according to some embodiments, taken along line X1-X2 of FIG. 1.
Figure 10:
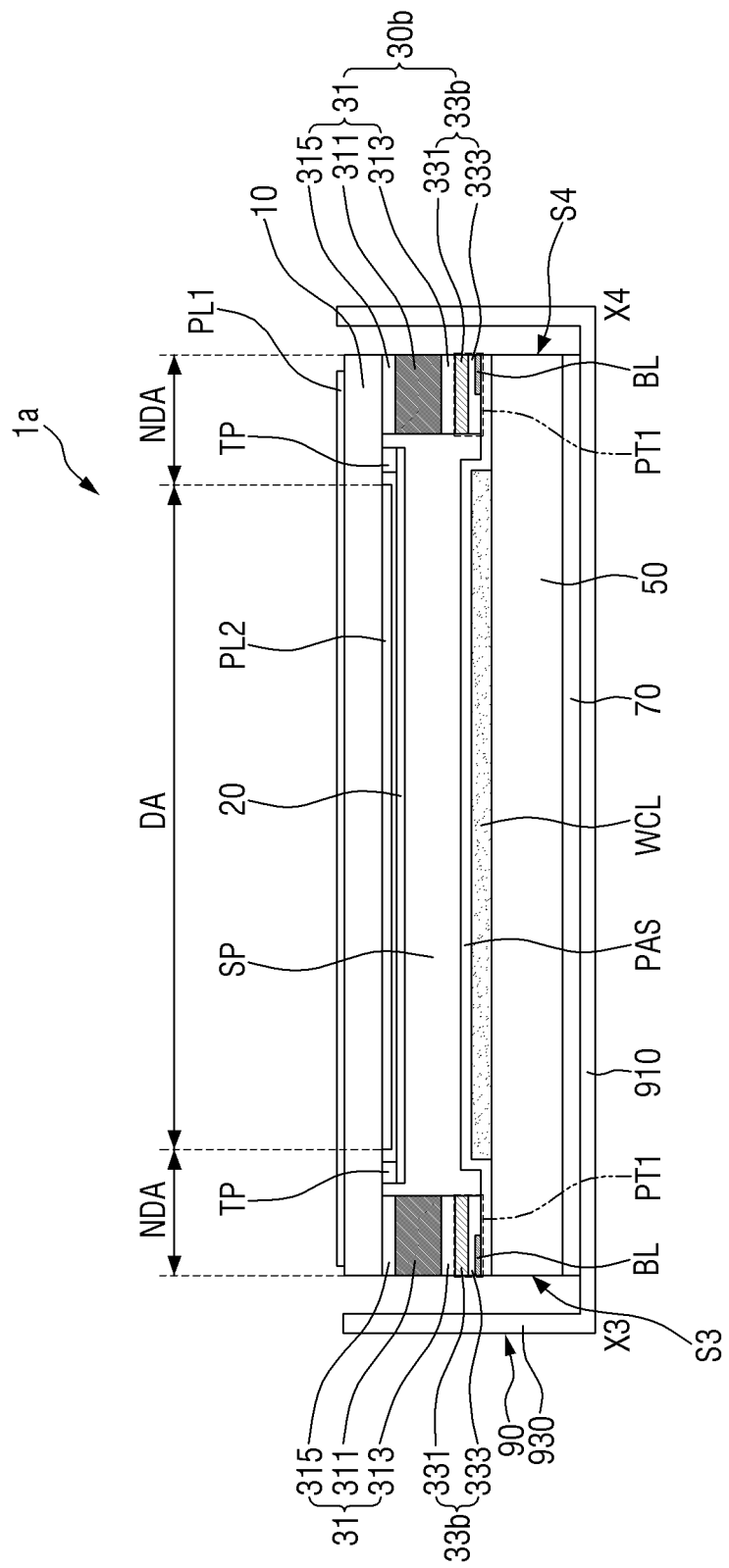
FIG. 10 is a cross-sectional view of a display device according to some embodiments, taken along line X3-X4 of FIG. 1.

FIG. 8 is a perspective view showing an unfolded state of a first light transmission blocking tape in a display device according to some embodiments. FIG. 9 is a cross-sectional view of a display device according to some embodiments, taken along line X1-X2 of FIG. 1. FIG. 10 is a cross-sectional view of a display device according to some embodiments, taken along line X3-X4 of FIG. 1.

Referring to FIGS. 8 to 10, a display device 1a according to some embodiments is different from the display device 1 described above with reference to FIGS. 3 to 6 in the configuration of a coupling member 30b, while the configurations of the other components are the same or similar as the embodiments in FIGS. 3 to 6. Therefore, a redundant description will be omitted and differences are mainly described.

The coupling member 30b includes the coupling tape 31, which is a light absorbing tape, and a first light transmission blocking tape 33b.

The first light transmission blocking tape 33b includes an overlap portion POV extending along the opposite direction of the first direction DR1, which is a direction toward the first side surface S1 serving as a light incident surface, and extends from the first portion PT1 as compared with the first light transmission blocking tape 33 shown in FIG. 3.

The overlap portion POV may overlap the light source 43, and the base layer 331 of the overlap portion POV may overlap the space between the light source 43 and the first side surface S1 of the light guide plate 50. Accordingly, light leakage can be prevented from occurring in the space between the light source 43 and the first side surface S1 of the light guide plate 50.

In some embodiments, the overlap portion POV may extend to the printed circuit board 41. When the surface of the printed circuit board 41 on which the light source 43 is disposed is referred to as an upper surface, the surface of the printed circuit board 41 facing the bottom surface 910 of the receiving member 90 is referred to as a lower side surface, and the opposite surface of the lower surface is referred to as an upper side surface, in some embodiments, the first adhesive layer 333 of the overlap portion POV may be in contact with the upper side surface of the printed circuit board 41. However, the present disclosure is not limited thereto or thereby, and the shape of the overlap portion POV may be variously changed as long as the light leakage in the space between the light source 43 and the first side surface S1 of the light guide plate 50 can be prevented.

Figure 11:
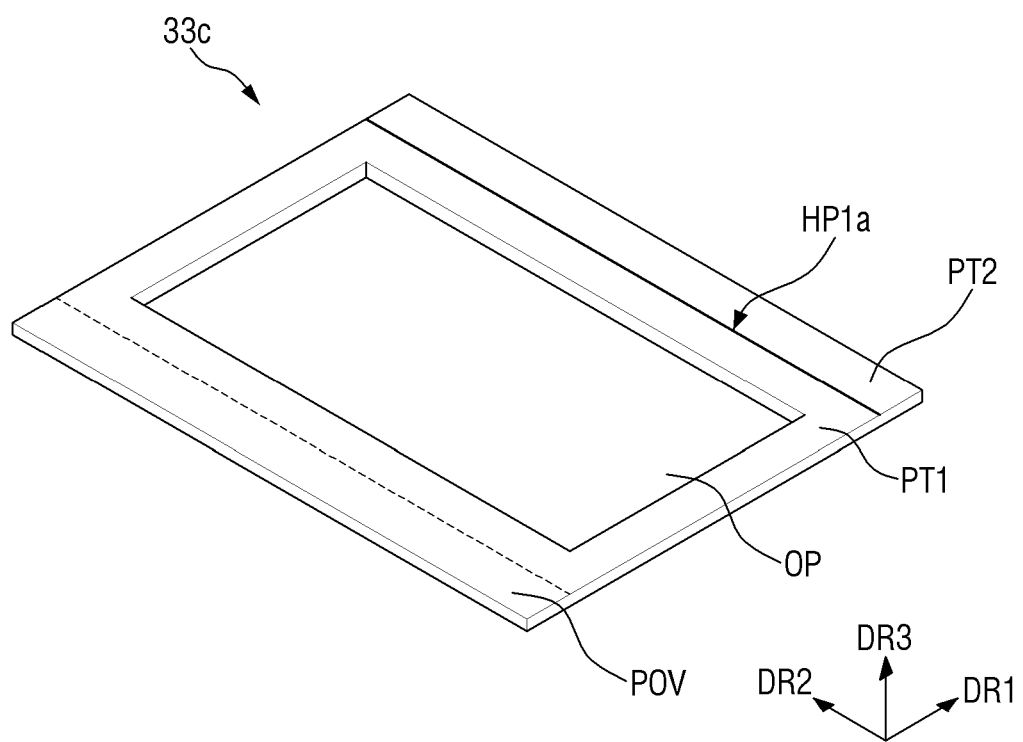
FIG. 11 is a perspective view showing a modified embodiment of FIG. 8.

FIG. 11 is a perspective view showing a modified embodiment of FIG. 8. Referring to FIG. 11, a first light transmission blocking tape 33c differs from the first light transmission blocking tape 33b shown in FIG. 8 in that the first groove portion HP1a extends along the second direction DR2 in which the boundary between the first portion PT1 and the second portion PT2 extends, and the configuration of the other components are substantially the same as the embodiment of FIG. 8.

Figure 12:
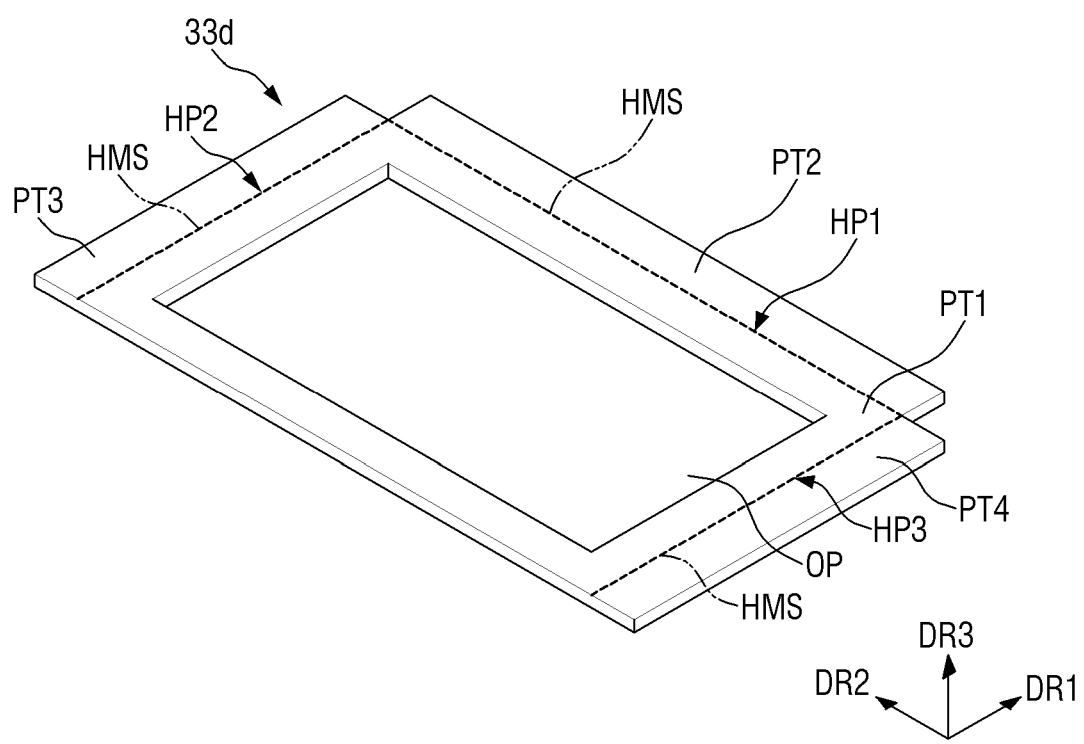
FIG. 12 is a perspective view showing an unfolded state of a first light transmission blocking tape in a display device according to some embodiments.
Figure 13:
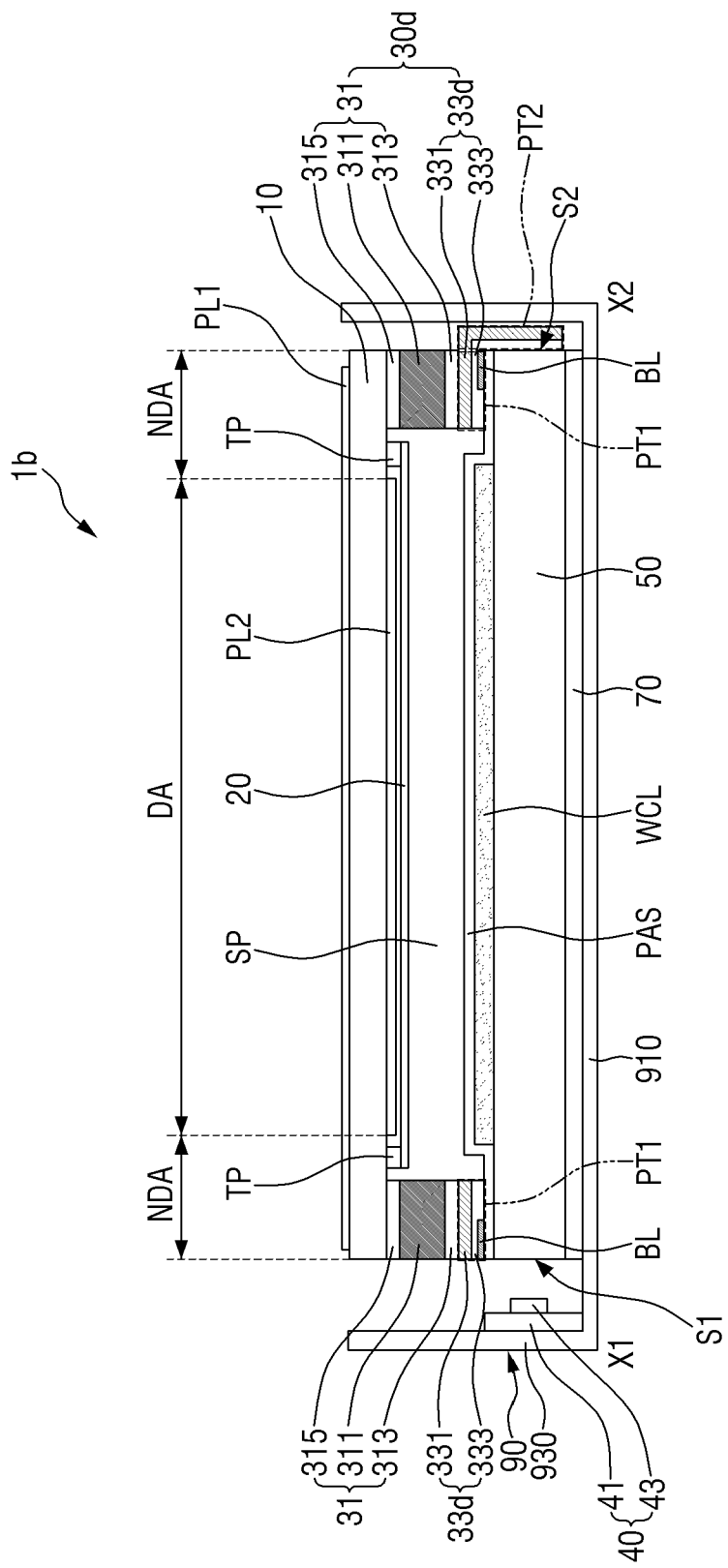
FIG. 13 is a cross-sectional view of a display device according to some embodiments, taken along line X1-X2 of FIG. 1.
Figure 14:
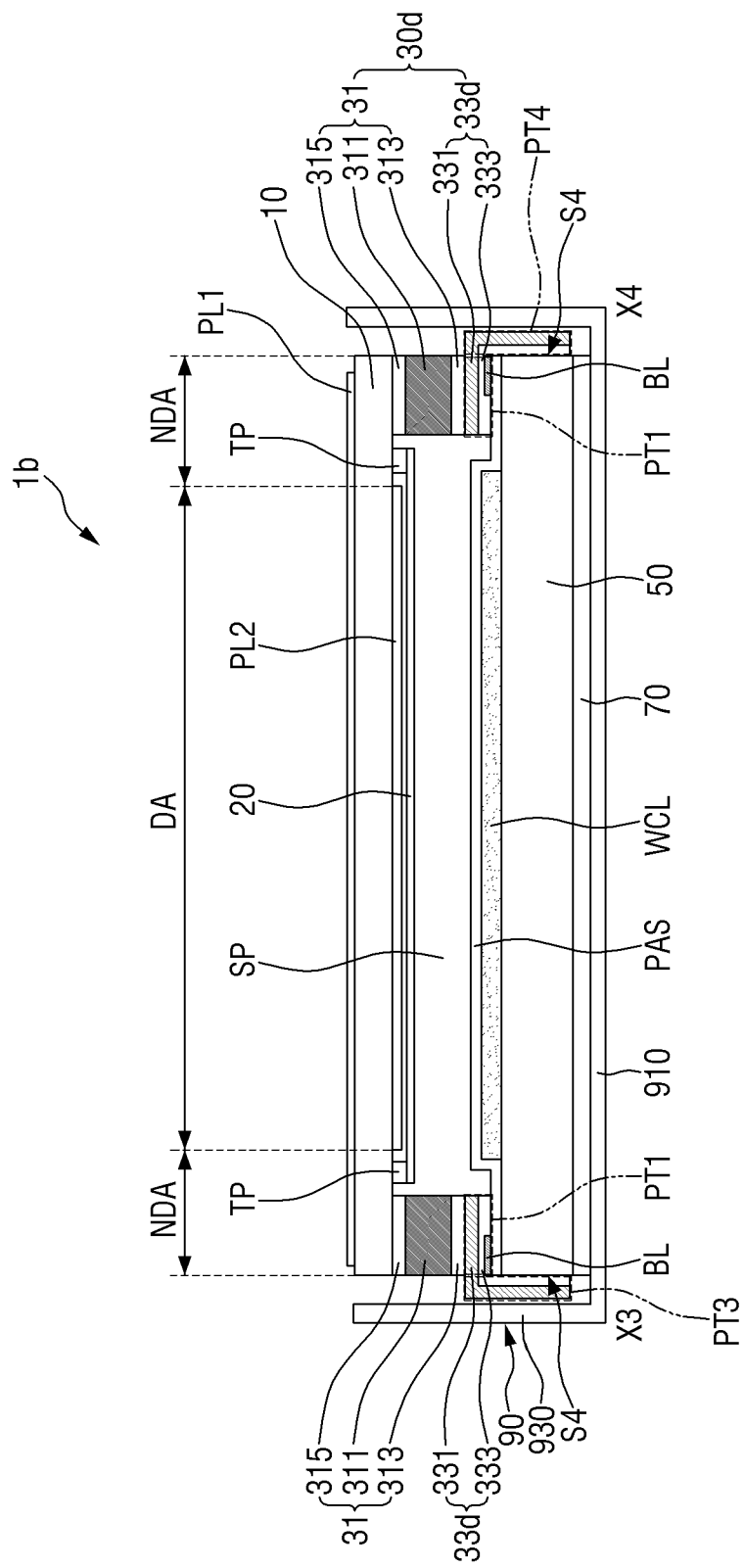
FIG. 14 is a cross-sectional view of a display device according to some embodiments, taken along line X3-X4 of FIG. 1.

FIG. 12 is a perspective view showing an unfolded state of a first light transmission blocking tape in a display device according to some embodiments. FIG. 13 is a cross-sectional view of a display device according to some embodiments, taken along line X1-X2 of FIG. 1. FIG. 14 is a cross-sectional view of a display device according to some embodiments, taken along line X3-X4 of FIG. 1.

Referring to FIGS. 12 to 14, a display device 1b according to some embodiments is different from the display device 1 described above with reference to FIGS. 3 to 6 in a configuration of a coupling member 30d, while the configurations of the other components are substantially the same. Therefore, a redundant description will be omitted and differences are mainly described.

The coupling member 30d includes the coupling tape 31 which is a light absorbing tape and a first light transmission blocking tape 33d.

The first light transmission blocking tape 33d further includes a third portion PT3 and a fourth portion PT4 extending from the first portion PT1 as compared with the first light transmission blocking tape 33 shown in FIG. 3.

A second groove portion HP2 may be further provided between the first portion PT1 and the third portion PT3 so that the third portion PT3 can be more easily bent.

In some embodiments, the second groove portion HP2 may include a plurality of engraved grooves HMS, which are arranged along the extending direction, e.g., the first direction DR1, of the boundary between the first portion PT1 and the third portion PT3, and spaced apart from each other.

Further, a third groove portion HP3 may further be provided between the first portion PT1 and the fourth portion PT4 so that the fourth portion PT4 can be more easily bent.

In some embodiments, similar to the second groove portion HP2, the third groove portion HP3 may include a plurality of engraved grooves HMS, which are arranged along the extending direction, e.g., the first direction DR1, of the boundary between the first portion PT1 and the third portion PT3, and spaced apart from each other.

As shown in FIGS. 12 and 14, the third portion PT3 extends from the first portion PT1 along the second direction DR2 and is bent toward the opposite direction of the third direction DR3 to be coupled with the third side surface S3 of the light guide plate 50. That is, the base layer 331 of the third portion PT3 may cover the third side surface S3 of the light guide plate 50, and the first adhesive layer 333 of the third portion PT3 may be in contact with the third side surface S3 of the light guide plate 50.

As shown in FIGS. 12 and 14, the fourth portion PT4 extends from the first portion PT1 along the opposite direction of the second direction DR2 and is bent toward the opposite direction of the third direction DR3 to be coupled with the fourth side surface S4 of the light guide plate 50. That is, the base layer 331 of the fourth portion PT4 may cover the fourth side surface S4 of the light guide plate 50, and the first adhesive layer 333 of the fourth portion PT4 may be in contact with the fourth side surface S4 of the light guide plate 50.

When the base layer 331 includes a light absorbing material, the third portion PT3 may further block the light leakage generated on the third side surface S3 of the light guide plate 50, and the fourth portion PT4 may further block the light leakage generated on the fourth side surface S4 of the light guide plate 50.

Alternatively, when the base layer 331 includes a light reflecting material, the third portion PT3 may reflect the light emitted to the third side surface S3 of the light guide plate 50 to the light guide plate 50, and the fourth portion PT4 may reflect the light emitted from the fourth side surface S4 of the light guide plate 50 to the light guide plate 50. Thus, it is possible to further increase the light efficiency of the display device 1b in addition to the light leakage blocking effect.

Figure 15:
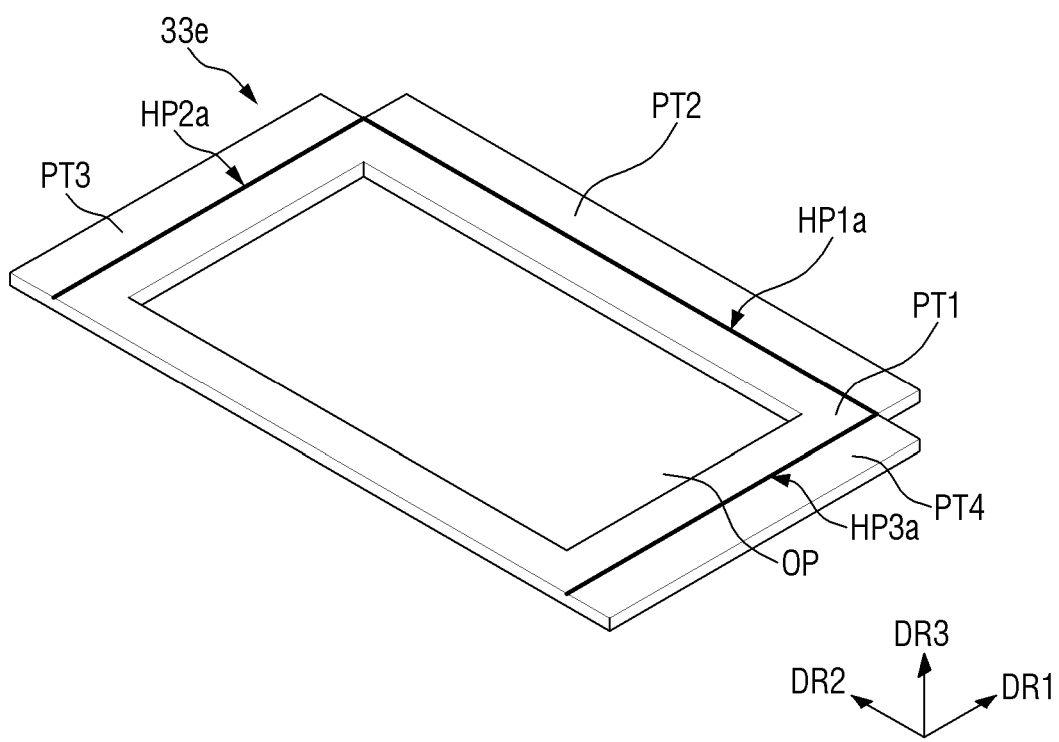
FIG. 15 is a perspective view showing a modified embodiment of FIG. 12.

FIG. 15 is a perspective view showing a modified embodiment of FIG. 12. Referring to FIG. 15, a first light transmission blocking tape 33e according to some embodiments differs from the first light transmission blocking tape 33d shown in FIG. 12 in that the first groove portion HP1a extends along the second direction DR2 in which the boundary between the first portion PT1 and the second portion PT2 extends, a second groove portion HP2a extends along the first direction DR1 in which the boundary between the first portion PT1 and the third portion PT3 extends, and a third groove portion HP3a extends along the first direction DR1 in which the boundary between the first portion PT1 and the fourth portion PT4 extends, while the configurations of the other components are substantially the same.

Figure 16:
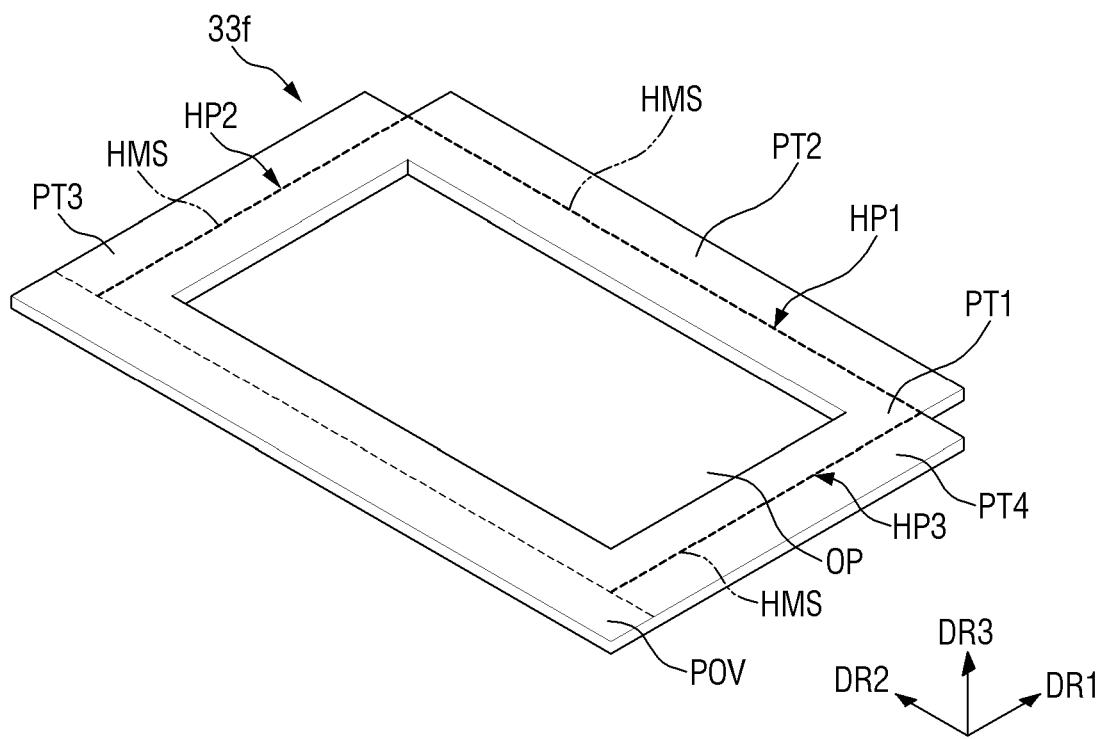
FIG. 16 is a perspective view showing an unfolded state of a first light transmission blocking tape in a display device according to some embodiments.
Figure 17:
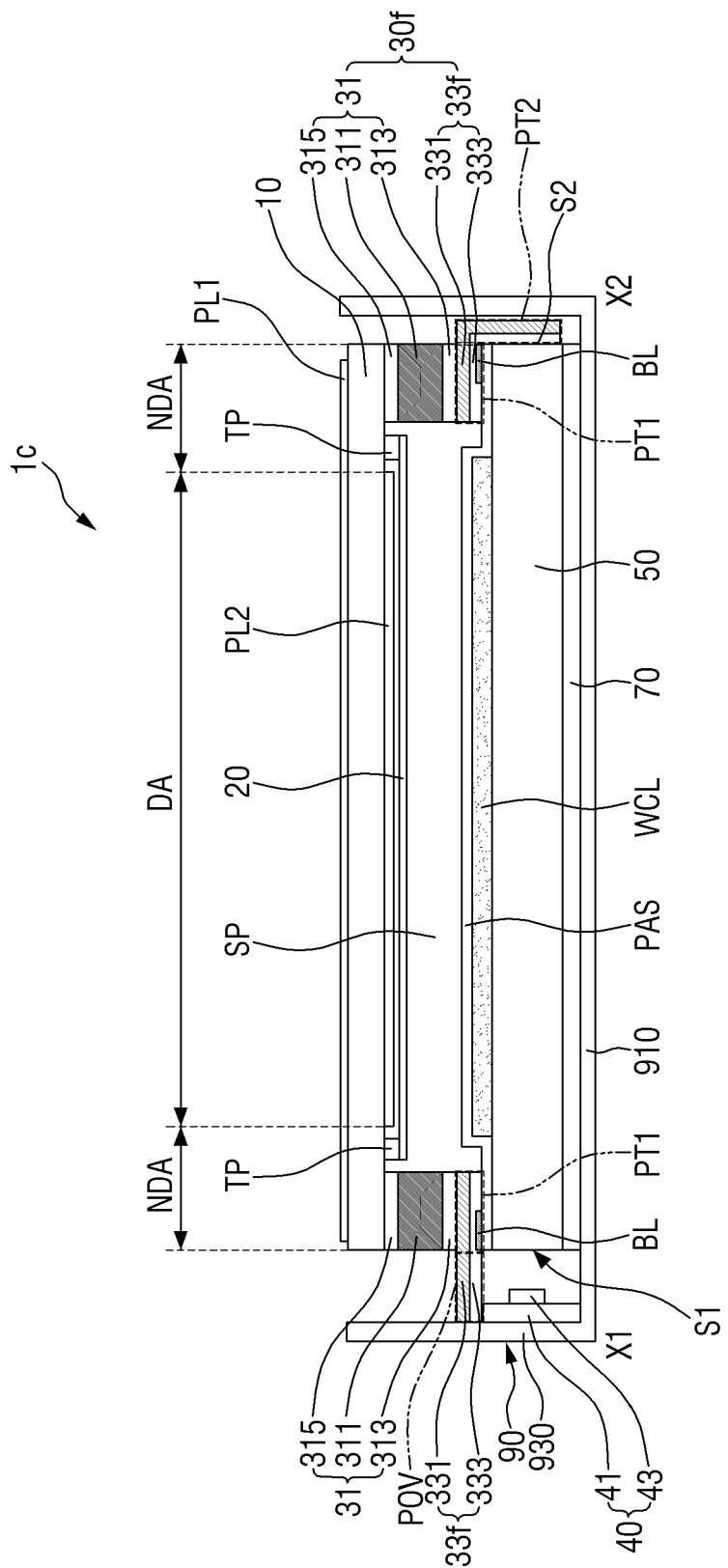
FIG. 17 is a cross-sectional view of a display device according to some embodiments, taken along line X1-X2 of FIG. 1.
Figure 18:
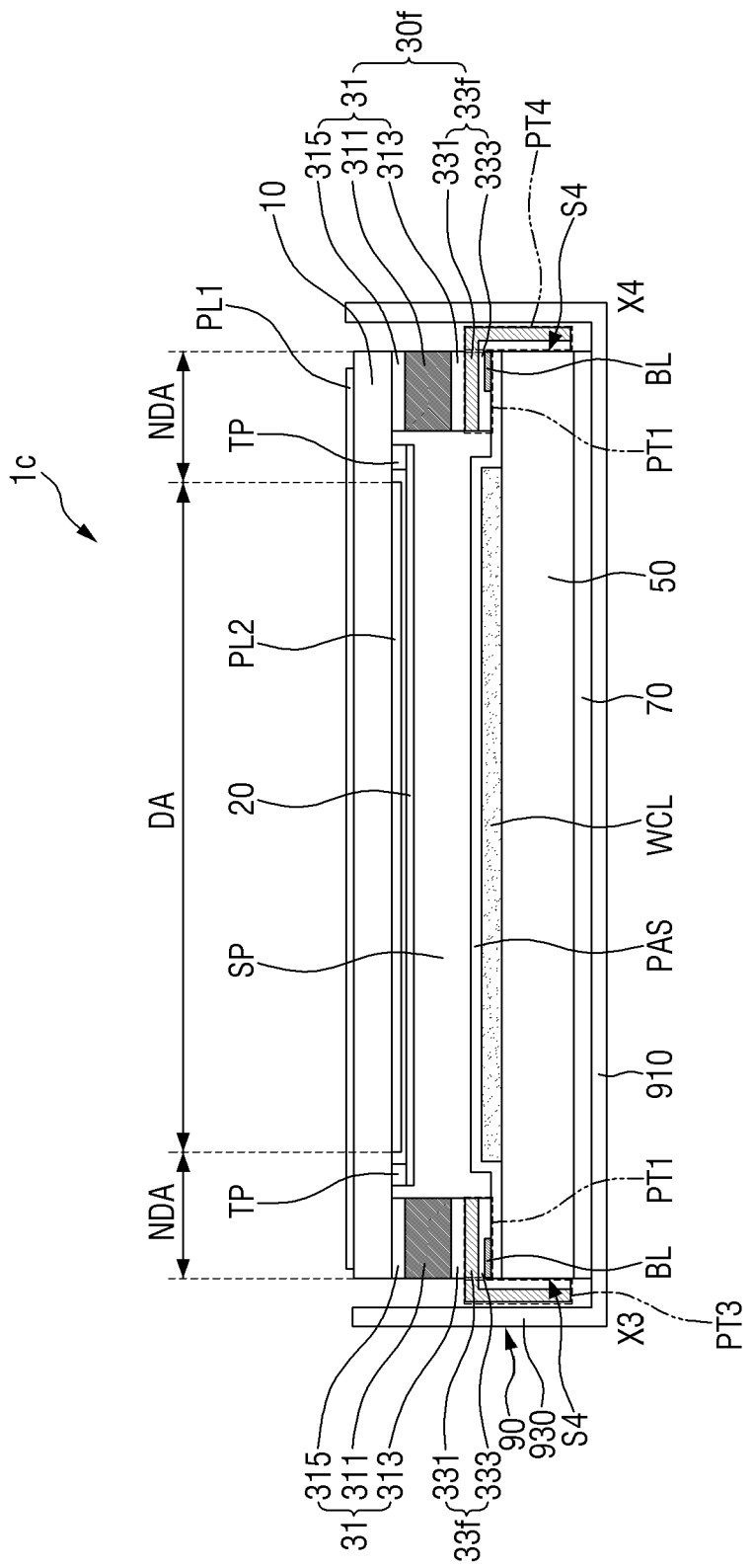
FIG. 18 is a cross-sectional view of a display device according to some embodiments, taken along line X3-X4 of FIG. 1.

FIG. 16 is a perspective view showing an unfolded state of a first light transmission blocking tape in a display device according to some embodiments. FIG. 17 is a cross-sectional view of a display device according to some embodiments, taken along line X1-X2 of FIG. 1. FIG. 18 is a cross-sectional view of a display device according to some embodiments, taken along line X3-X4 of FIG. 1.

Referring to FIGS. 16 to 18, a display device 1c according to some embodiments is different from the display device 1 described above with reference to FIGS. 3 to 6 in a configuration of a coupling member 30f, while the configurations of the other components are substantially the same. Therefore, a redundant description will be omitted and differences are mainly described.

The coupling member 30f includes the coupling tape 31 which is a light absorbing tape, and a first light transmission blocking tape 33f.

The first light transmission blocking tape 33d differs from the first light transmission blocking tape 33 shown in FIG. 3 in that it further includes the overlap portion POV, the third portion PT3 and the fourth portion PT4 extending from the first portion PT1, the second groove portion HP2 may be formed at the boundary between the first portion PT1 and the third portion PT3, and the third groove portion HP3 may be formed at the boundary between the first portion PT1 and the fourth portion PT4.

Since the configuration of the overlap portion POV is the same as the above description with reference to FIGS. 8 to 10, and the configuration of the third portion PT3, the fourth portion PT4, the second groove portion HP2, and the third groove portion HP3 is the same as the above description with reference to FIGS. 12 to 14, a redundant description will be omitted.

Figure 19:
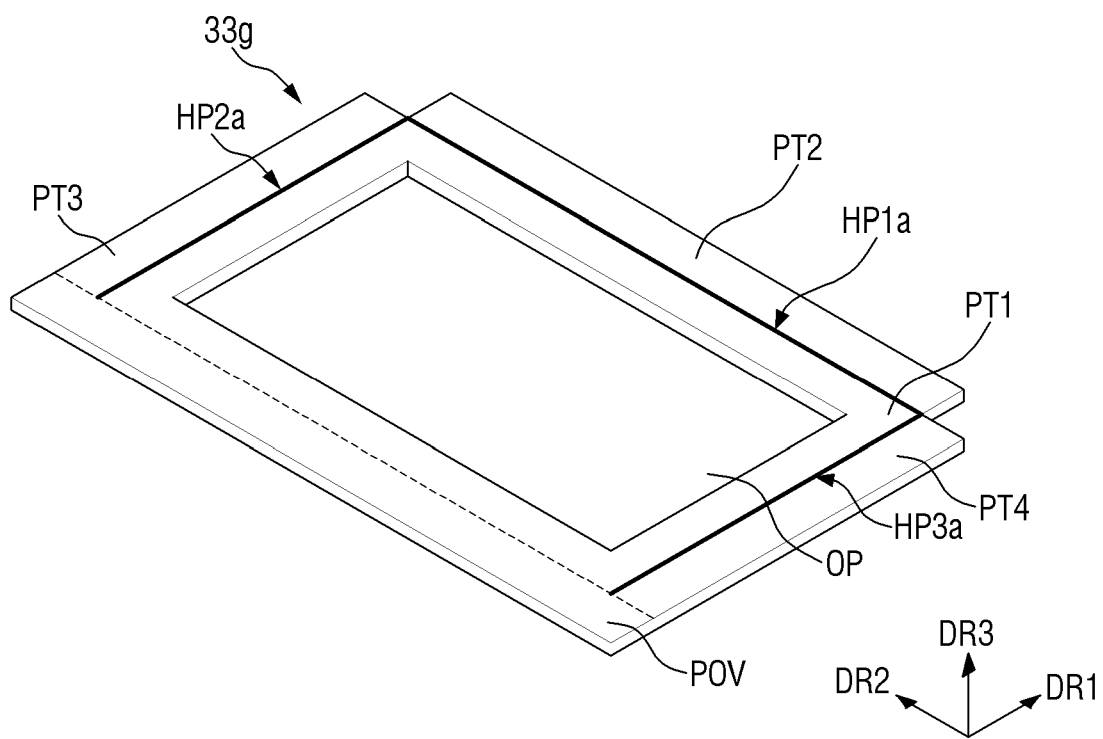
FIG. 19 is a perspective view showing a modified embodiment of FIG. 16.

FIG. 19 is a perspective view showing a modified embodiment of FIG. 16. Referring to FIG. 19, a first light transmission blocking tape 33g according to some embodiments differs from the first light transmission blocking tape 33f shown in FIG. 16 in that the first groove portion HP1a extends along the second direction DR2 in which the boundary between the first portion PT1 and the second portion PT2 extends, the second groove portion HP2a extends along the first direction DR1 in which the boundary between the first portion PT1 and the third portion PT3 extends and the third groove portion HP3a extends along the first direction DR1 in which the boundary between the first portion PT1 and the fourth portion PT4 extends, while the configurations of the other components are substantially the same.

Figure 20:
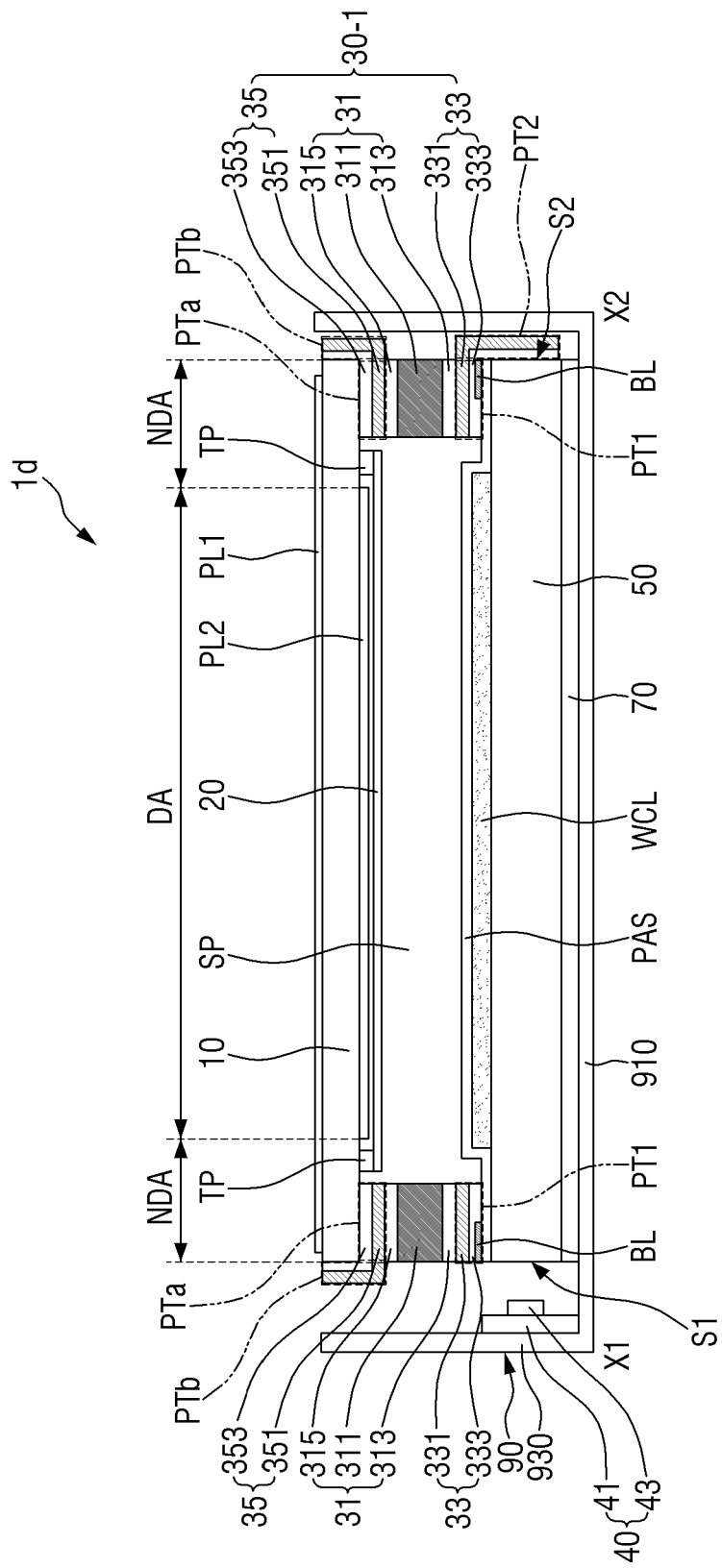
FIG. 20 is a cross-sectional view of a display device according to some embodiments, taken along line X1-X2 of FIG. 1.
Figure 21:
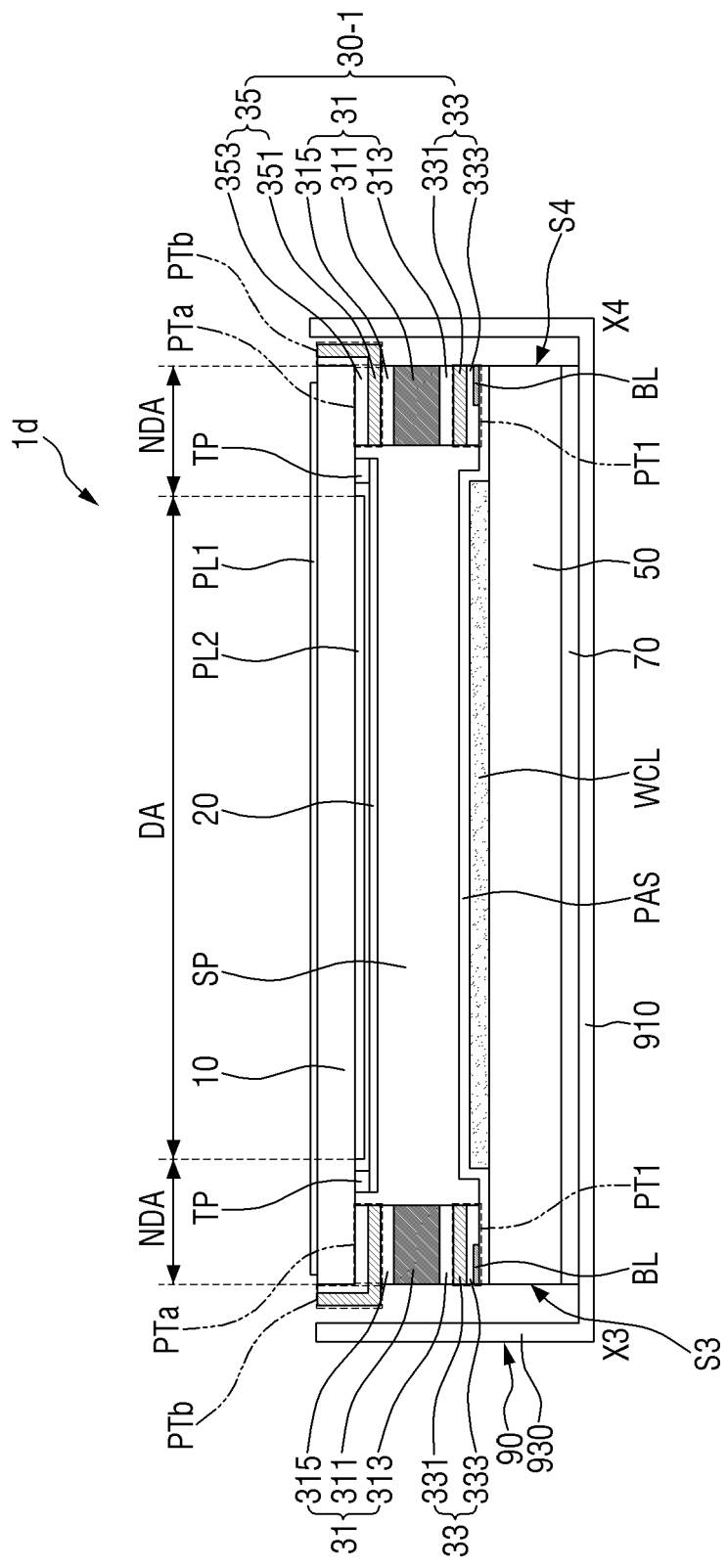
FIG. 21 is a cross-sectional view of a display device according to some embodiments, taken along line X3-X4 of FIG. 1.

FIG. 20 is a cross-sectional view of a display device according to some embodiments, taken along line X1-X2 of FIG. 1. FIG. 21 is a cross-sectional view of a display device according to some embodiments, taken along line X3-X4 of FIG. 1.

Referring to FIGS. 20 and 21, a display device 1d according to some embodiments is different from the display device 1 described above with reference to FIGS. 3 to 6 in that a coupling member 30-1 further includes a second light transmission blocking tape 35, while the configurations of the other components are substantially the same. Therefore, a redundant description will be omitted and differences are mainly described.

The coupling member 30-1 includes a first light transmission blocking tape 33, a coupling tape 31, which is a light absorbing tape located on the first light transmission blocking tape 33, and a second light transmission blocking tape 35 located on the coupling tape 31. That is, the coupling member 30-1 may have a structure in which three different kinds of tapes are combined.

In the laminated structure of the second light transmission blocking tape 35, the second light transmission blocking tape 35 may include a base layer 351 and an adhesive layer 353 (located on the base layer 351).

In some embodiments, the base layer 351 of the second light transmission blocking tape 35 may include a light absorbing material such as a black pigment and/or a dye. In some embodiments, the base layer 351 may be located on the coupling tape 31, which is a light absorbing tape, and may be in contact with the third adhesive layer 315 of the coupling tape 31.

The adhesive layer 353 is disposed on the base layer 351. The base layer 351 may be coupled to the display panel 10 via the adhesive layer 353.

When the second light transmission blocking tape 35 is divided regionally, the second light transmission blocking tape 35 may include a first portion PTa which is formed in a rectangular frame shape in a plan view and is disposed along the bottom edge of the display panel 10, and a second portion PTb which is bent and extended from the first portion PTa and coupled with the side surface of the display panel 10.

The base layer 351 of the first portion PTa may cover the bottom edge of the display panel 10, and the adhesive layer 353 of the first portion PTa may be in contact with the display panel 10. When the base layer 331 includes a light absorbing material, the first portion PTa of the second light transmission blocking tape 35 may block the light leakage generated at the bottom edge of the display panel 10.

The second portion PTb of the second light transmission blocking tape 35 includes (e.g., is) a portion of the base layer 351 and the adhesive layer 353 of the second light transmission blocking tape 35, which extends from the first portion PTa outwardly of the display panel 10 and is bent upward. The second portion PTb may be coupled to at least one side surface of the display panel 10. In some embodiments, the second portion PTb may be coupled to each of the four side surfaces of the display panel 10 as shown in FIGS. 20-21. That is, the base layer 351 of the second portion PTb may cover each of the four side surfaces of the display panel 10, and the adhesive layer 353 of the second portion PTb may be in contact with the four side surfaces of the display panel 10. However, this is merely an example, and in some embodiments, the second portion PTb may not be coupled to each of the four side surfaces of the display panel 10. For example, in some embodiments, the second portion PTb may cover only one side surface of the four side surfaces of the display panel 10, or two or three side surfaces thereof.

When the base layer 331 includes a light absorbing material, the second portion PTb may block light leakage generated from the side surface of the display panel 10.

Figure 22:
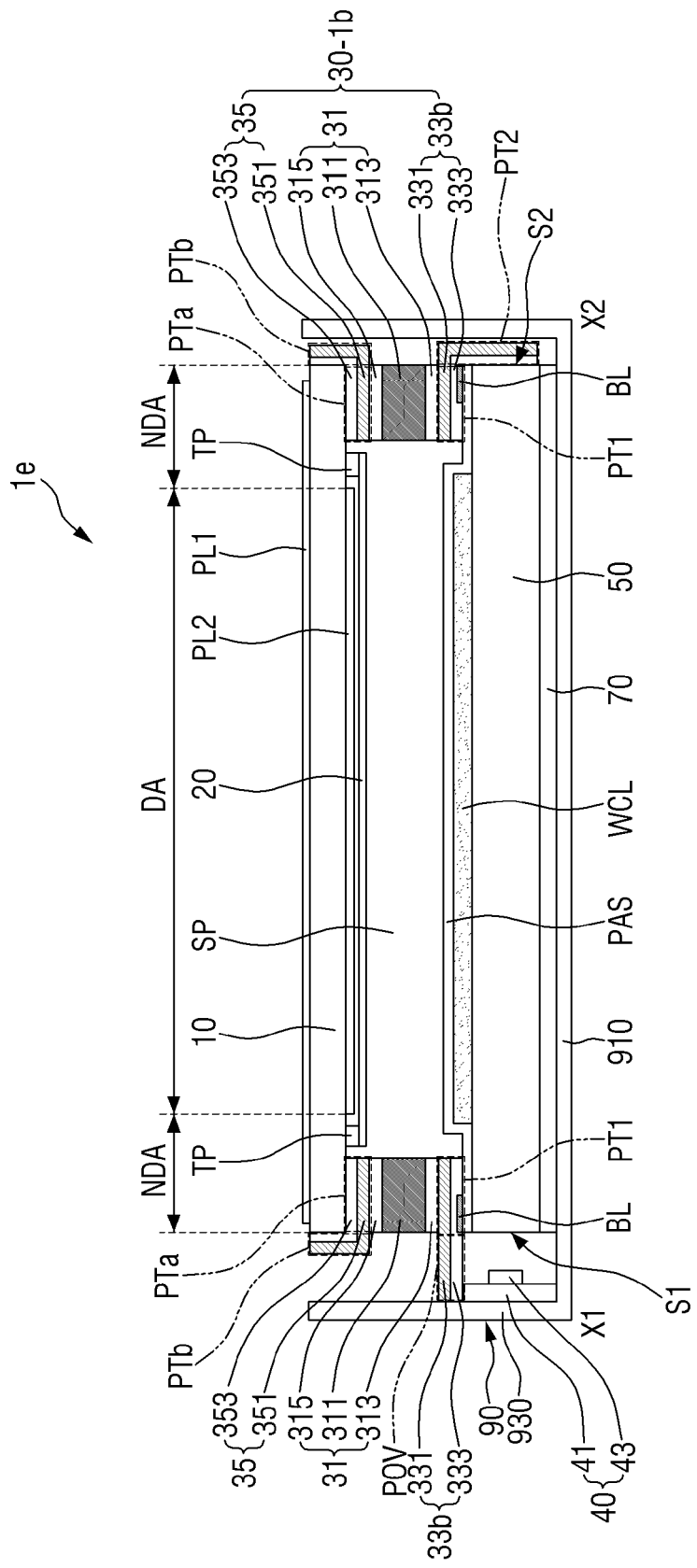
FIG. 22 is a cross-sectional view of a display device according to some embodiments, taken along line X1-X2 of FIG. 1.
Figure 23:
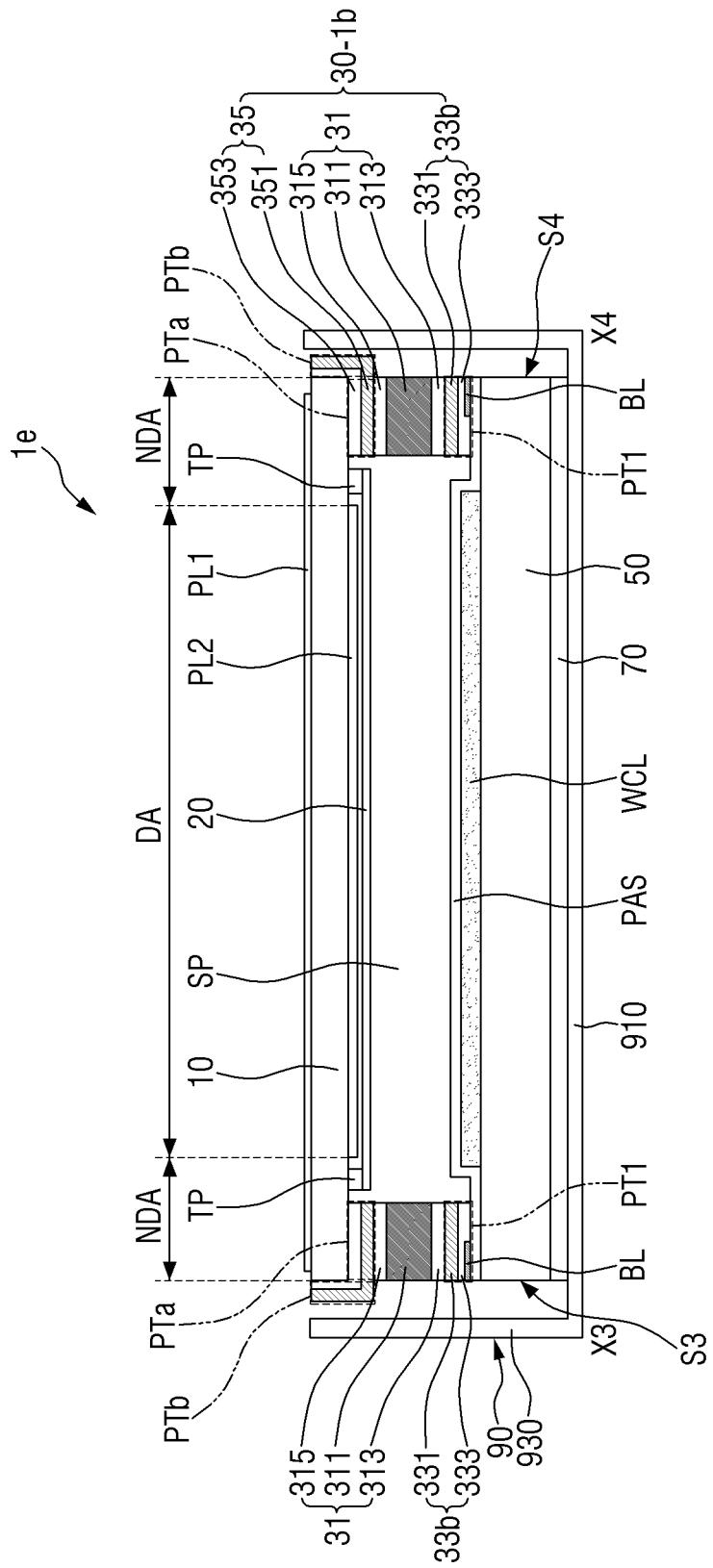
FIG. 23 is a cross-sectional view of a display device according to some embodiments, taken along line X3-X4 of FIG. 1.

FIG. 22 is a cross-sectional view of a display device according to some embodiments, taken along line X1-X2 of FIG. 1. FIG. 23 is a cross-sectional view of a display device according to some embodiments, taken along line X3-X4 of FIG. 1.

Referring to FIGS. 22 and 23, a display device 1e according to some embodiments is different from the display device 1a described above with reference to FIGS. 8 to 10 in that a coupling member 30-1b further includes a second light transmission blocking tape 35, while the configurations of the other components are substantially the same. Meanwhile, a description of the second light transmission blocking tape 35 is substantially the same as or similar to the above description with reference to FIGS. 20 and 21. Therefore, a redundant description will be omitted.

Figure 24:
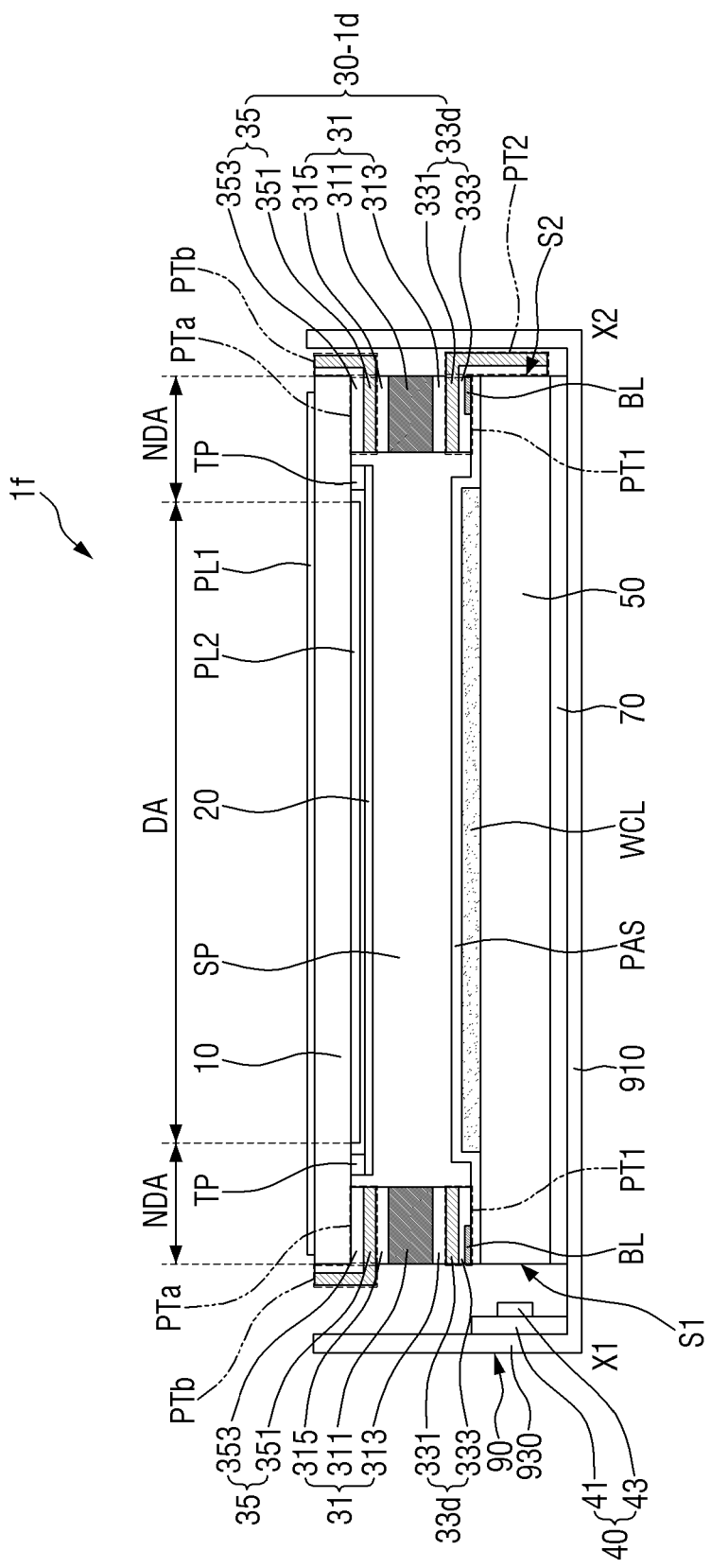
FIG. 24 is a cross-sectional view of a display device according to some embodiments, taken along line X1-X2 of FIG. 1.
Figure 25:
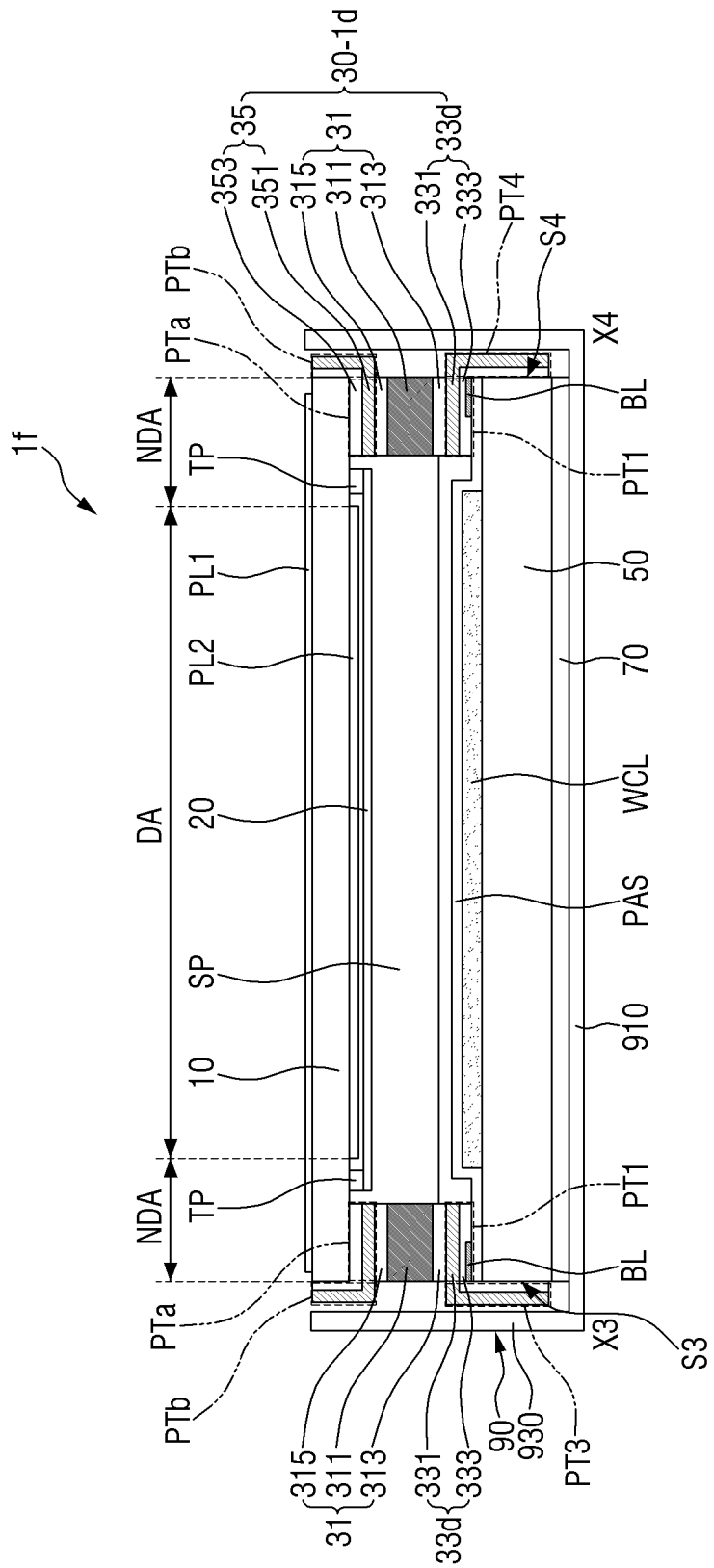
FIG. 25 is a cross-sectional view of a display device according to some embodiments, taken along line X3-X4 of FIG. 1.

FIG. 24 is a cross-sectional view of a display device according to some embodiments, taken along line X1-X2 of FIG. 1. FIG. 25 is a cross-sectional view of a display device according to some embodiments, taken along line X3-X4 of FIG. 1.

Referring to FIGS. 24 and 25, a display device 1f according to some embodiments is different from the display device 1b described above with reference to FIGS. 12 to 14 in that a coupling member 30-1d further includes a second light transmission blocking tape 35, and the configurations of the other components are substantially the same. Meanwhile, a description of the second light transmission blocking tape 35 is substantially the same as or similar to the above description with reference to FIGS. 20 and 21. Therefore, a redundant description will be omitted.

Figure 26:
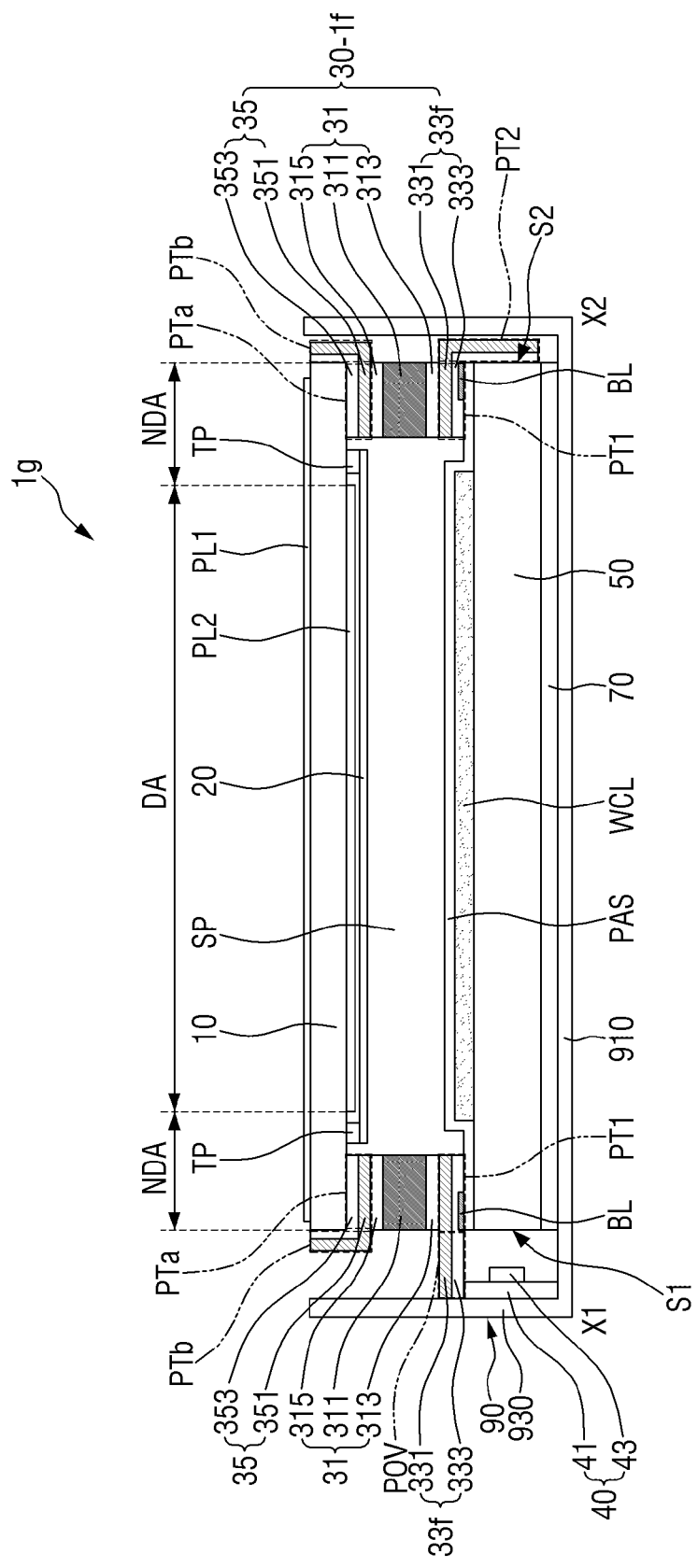
FIG. 26 is a cross-sectional view of a display device according to some embodiments, taken along line X1-X2 of FIG. 1.
Figure 27:
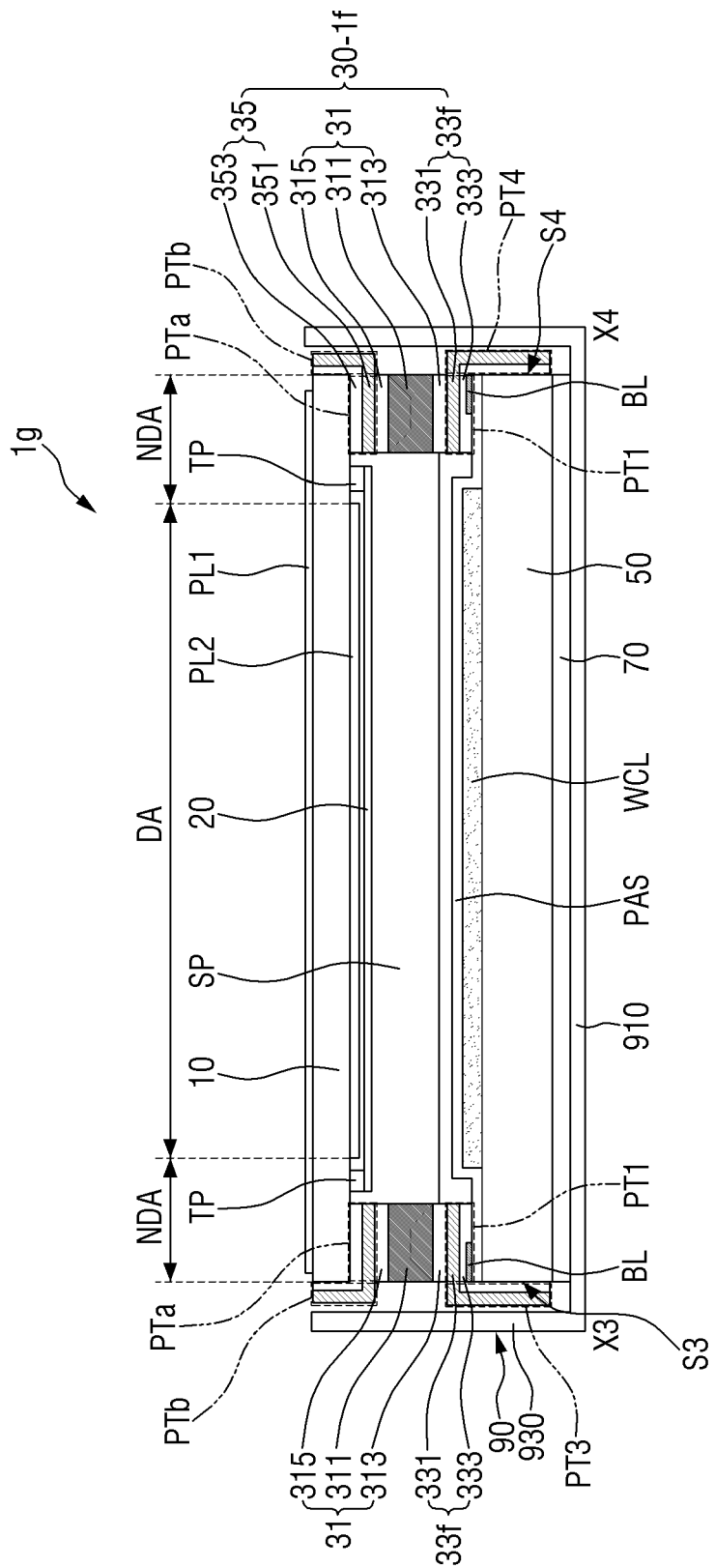
FIG. 27 is a cross-sectional view of a display device according to some embodiments, taken along line X3-X4 of FIG. 1.

FIG. 26 is a cross-sectional view of a display device according to some embodiments, taken along line X1-X2 of FIG. 1. FIG. 27 is a cross-sectional view of a display device according to some embodiments, taken along line X3-X4 of FIG. 1.

Referring to FIGS. 26 and 27, a display device 1g according to some embodiments is different from the display device 1c described above with reference to FIGS. 16 to 18 in that a coupling member 30-1f further includes a second light transmission blocking tape 35, while the configurations of the other components are substantially the same. Meanwhile, a description of the second light transmission blocking tape 35 is substantially the same as or similar to the above description with reference to FIGS. 20 and 21. Therefore, a redundant description will be omitted.

The display device according to the above-described embodiments has an advantage in that a coupling process is simplified because the light guide plate 50 and the display panel 10 are coupled using the coupling member 30-1f in which different kinds of tapes are combined. Also, since the light leakage in the light guide plate 50, the light leakage between the light guide plate 50 and the display panel 10, the light leakage in the display panel 10, and/or the like can be prevented by using the coupling member 30-1f without additionally providing a separate light leakage preventing member. As such, there is an advantage of simplifying the structure of the display device and the manufacturing process of the display device.

Although example embodiments of the present invention have been described, it is understood that the present invention is not limited to these example embodiments, but various changes and modifications can be made by one of ordinary skill in the art within the spirit and scope of the present invention as hereinafter claimed.

Therefore, the disclosed subject matter is not be limited to any single embodiment described herein, and the above-described embodiments are to be considered illustrative and not restrictive. Accordingly, the scope of the present inventive concept shall be determined only according to the attached claims, and equivalents thereof.

What is claimed is:

1. A display device comprising:
a light guide plate;
a light source facing a first side surface of the light guide plate;
a wavelength conversion layer located on an upper surface of the light guide plate;
a passivation layer located on the wavelength conversion layer and covering an upper surface of the wavelength conversion layer;
a light transmission blocking pattern on an edge portion of the upper surface of the light guide plate, the light transmission blocking pattern including a light absorbing material;
a display panel located on the light guide plate; and
a coupling member located between the light guide plate and the display panel to couple the light guide plate with the display panel,
wherein the coupling member includes a first light transmission blocking tape having a first portion arranged along the edge portion of the upper surface of the light guide plate and a second portion extending from the first portion and covering a side surface other than the first side surface of the light guide plate, and a coupling tape located on the first portion of the first light transmission blocking tape and coupled to the first light transmission blocking tape,
wherein the light transmission blocking pattern is between the passivation layer and the first portion of the first light transmission blocking tape,
wherein the passivation layer is between the light guide plate and the first portion of the first light transmission blocking tape, and
wherein the light transmission blocking pattern directly contacts the passivation layer.

2. The display device of claim 1, wherein the display panel includes a display area and a non-display area surrounding the display area, and the coupling member overlaps the non-display area and does not overlap the display area.

3. The display device of claim 1, wherein the first light transmission blocking tape includes a base layer containing a light reflecting material and/or a light absorbing material, and a first adhesive layer located between the base layer and the light guide plate.

4. The display device of claim 3, wherein the first adhesive layer is in contact with a side surface of the light guide plate.

5. The display device of claim 3, wherein the coupling tape includes a light absorbing layer located on the first portion of the first light transmission blocking tape, a second adhesive layer located between the first portion and the light absorbing layer, and a third adhesive layer located between the light absorbing layer and the display panel.

6. The display device of claim 5, wherein the third adhesive layer is in contact with a lower surface of the display panel.

7. The display device of claim 5, wherein the light absorbing layer is formed of a foam member.

8. The display device of claim 5, wherein the light absorbing layer is formed of a black film.

9. The display device of claim 1, wherein a groove portion having an engraved shape is at a boundary between the first portion and the second portion of the first light transmission blocking tape.

10. The display device of claim 9, wherein the groove portion extends along the boundary between the first portion and the second portion.

11. The display device of claim 9, wherein the groove portion includes a plurality of grooves arranged along the boundary between the first portion and the second portion of the first light transmission blocking tape and spaced from each other.

12. The display device of claim 1, wherein the first light transmission blocking tape further includes an overlap portion which extends from the first portion outwards from the first side surface and overlaps the light source.

13. The display device of claim 12, further comprising a printed circuit board on which the light source is mounted, wherein the overlap portion is in contact with the printed circuit board.

14. The display device of claim 1, wherein the light guide plate further includes a second side surface opposite to the first side surface, and wherein the second portion of the first light transmission blocking tape is coupled to the second side surface.

15. The display device of claim 14,
wherein the light guide plate further includes a third side surface connecting one end of the first side surface with one end of the second side surface and a fourth side surface connecting the other end of the first side surface with the other end of the second side surface, and
wherein the first light transmission blocking tape further includes a third portion coupled to the first portion and coupled to the third side surface and a fourth portion coupled to the first portion and coupled to the fourth side surface.

16. The display device of claim 15, wherein a first groove portion having an engraved shape is at a boundary between the first portion and the second portion of the first light transmission blocking tape, a second groove portion having an engraved shape is at a boundary between the first portion and the third portion of the first light transmission blocking tape, and a third groove portion having an engraved shape is at a boundary between the first portion and the fourth portion of the first light transmission blocking tape.

17. The display device of claim 1, wherein the coupling member further includes a second light transmission blocking tape having a third portion located between the coupling tape and the display panel and arranged along a bottom edge of the display panel, and a fourth portion extending from the third portion and coupled to at least one side surface of the display panel.

18. The display device of claim 17,
wherein the second light transmission blocking tape includes a base layer containing a light absorbing material, and an adhesive layer located between the base layer and the display panel and in contact with the display panel, and
wherein the coupling tape includes a light absorbing layer located on the first portion, a second adhesive layer located between the first portion and the light absorbing layer, and a third adhesive layer located between the light absorbing layer and the second light transmission blocking tape and in contact with the base layer of the second light transmission blocking tape.

19. The display device of claim 1, wherein the light source is a blue light source which emits light of a blue wavelength, and the wavelength conversion layer includes quantum dots.

20. The display device of claim 1, wherein the first portion of the first light transmission blocking tape includes a base layer, containing a light reflecting material and/or a light absorbing material, and a first adhesive layer located between the base layer and the passivation layer and in contact with the passivation layer.

21. The display device of claim 1, wherein the first portion of the first light transmission blocking tape is in contact with the light transmission blocking pattern.

22. The display device of claim 1, further comprising an optical film located in a space surrounded by the light guide plate, the display panel, and the coupling member.

23. The display device of claim 22, wherein the optical film is coupled to the display panel via an adhesive tape.

24. The display device of claim 1, wherein the first portion has an edge adjacent to a boundary between the first portion and the second portion of the first light transmission blocking tape,
   wherein the boundary and the edge are facing in directions oppositely away from each, other,
   wherein the coupling tape has a side portion on above the edge of the first portion and extending toward the boundary, and
   wherein a first width between the boundary and the edge of the first portion is greater than a second width of the side portion extending toward the boundary.

25. A display device comprising:
   a light guide plate;
   a light source facing a first side surface of the light guide plate;
   a light transmission blocking pattern on an edge portion of an upper surface of the light guide plate, the light transmission blocking pattern including a light absorbing material;
   a display panel located on the light guide plate;
   a coupling member located between the light guide plate and the display panel to couple the light guide plate with the display panel;
   an optical film located in a space surrounded by the light guide plate, the display panel, and the coupling member; and
   a polarizing layer between the optical film and the display panel,
   wherein the coupling member includes a first light transmission blocking tape having a first portion arranged along the edge portion of the upper surface of the light guide plate and a second portion extending from the first portion and coupled to a side surface other than the first side surface of the light guide plate, and a coupling tape located on the first portion of the first light transmission blocking tape and coupled to the first light transmission blocking tape,
   wherein the light transmission blocking pattern is between the light guide plate and the first portion of the first light transmission blocking tape,
   wherein the optical film is coupled to the display panel via an adhesive tape,
   wherein the adhesive tape is located in a space surrounded by the light guide plate, the display panel, and the coupling member, and is in contact with a lower surface of the display panel, and
   wherein the adhesive tape is spaced apart from the polarizing layer.

26. A display device comprising:
   a light guide plate;
   a light source located on one side of the light guide plate;
   a display panel located on the light guide plate;
   a wavelength conversion layer located on an upper surface of the light guide plate;
   a passivation layer located on the wavelength conversion layer and covering an upper surface of the wavelength conversion layer;
   a light transmission blocking pattern on an edge portion of the upper surface of the light guide plate, the light transmission blocking pattern including a light absorbing material; and
   a coupling member located between the light guide plate and the display panel to couple the light guide plate with the display panel,
   wherein the coupling member includes a light transmission blocking tape having a first portion arranged along a bottom edge of the display panel and a second portion extending from the first portion and covering one side surface of the display panel, and a coupling tape located between the first portion of the light transmission blocking tape and the light guide plate and coupled to the light transmission blocking tape,
   wherein the light transmission blocking pattern is between the passivation layer and the first portion of the light transmission blocking tape,
   wherein the passivation layer is between the light guide plate and the first portion of the light transmission blocking tape, and
   wherein the light transmission blocking pattern directly contacts the passivation layer.

27. The display device of claim 26, wherein the display panel includes a display area and a non-display area surrounding the display area, and the coupling member overlaps the non-display area and does not overlap the display area.

28. The display device of claim 26, wherein the light transmission blocking tape includes a base layer containing a light absorbing material and a first adhesive layer located between the base layer and the display panel and in contact with the display panel.

29. The display device of claim 28, wherein the coupling tape includes a light absorbing layer located between the first portion and the light guide plate, a second adhesive layer located between the light absorbing layer and the light guide plate, and a third adhesive layer located between the light absorbing layer and the display panel and in contact with the base layer.

\* \* \* \* \*